United States Patent
Sumi

(10) Patent No.: US 11,129,033 B2
(45) Date of Patent: Sep. 21, 2021

(54) WIRELESS COMMUNICATION DEVICE, WIRELESS COMMUNICATION METHOD AND COMPUTER READABLE MEDIUM

(71) Applicant: Mitsubishi Electric Corporation, Tokyo (JP)

(72) Inventor: Takenori Sumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/628,642

(22) PCT Filed: Aug. 28, 2017

(86) PCT No.: PCT/JP2017/030791
§ 371 (c)(1),
(2) Date: Jan. 3, 2020

(87) PCT Pub. No.: WO2019/043762
PCT Pub. Date: Mar. 7, 2019

(65) Prior Publication Data
US 2020/0187027 A1   Jun. 11, 2020

(51) Int. Cl.
*H04W 24/04* (2009.01)
*G01S 5/02* (2010.01)
(Continued)

(52) U.S. Cl.
CPC .......... *H04W 24/04* (2013.01); *G01S 5/0284* (2013.01); *H04L 1/0013* (2013.01); *H04L 1/0042* (2013.01); *H04W 28/0284* (2013.01)

(58) Field of Classification Search
CPC . H04W 24/04; H04W 28/0284; G01S 5/0284; H04L 1/0013; H04L 1/0042;
(Continued)

(56) References Cited

U.S. PATENT DOCUMENTS 5,857,155 A    1/1999   Hill et al.
7,783,316 B1 * 8/2010   Mitchell ............... H04H 20/38
                                                                 455/521
(Continued)

FOREIGN PATENT DOCUMENTS

JP    2001-230809 A    8/2001
JP    2001-352326 A   12/2001
(Continued)

OTHER PUBLICATIONS

Chihira et al., "Latest Technologies and Future Prospects of Train Vision System", Mitsubishi Electric Corporation Technical Report, vol. 90, No. 9, 2016, total of 7 pages.
(Continued)

*Primary Examiner* — Ajit Patel
*Assistant Examiner* — Wilfred Thomas
(74) *Attorney, Agent, or Firm* — Birch, Stewart, Kolasch & Birch, LLP

(57) ABSTRACT

A delivery data transmission device (100A) is mounted on a train, and transmits delivery data. A redundancy-degree decision unit (115A) decides a redundancy-degree of an erasure-correction code to be applied to delivery data when a distance between the delivery data transmission device (100A) and a next arrival station the train stops at next becomes equal to or smaller than a threshold value. An encoding unit (116B) encodes the delivery data at an encoding rate corresponding to the redundancy-degree decided by the redundancy-degree decision unit (115A).

5 Claims, 18 Drawing Sheets

(51) Int. Cl.
*H04L 1/00* (2006.01)
*H04W 28/02* (2009.01)
*B61L 27/00* (2006.01)
*B61L 15/00* (2006.01)
*B61L 25/02* (2006.01)

(58) Field of Classification Search
CPC ... H04L 1/0057; H04L 1/0026; H04L 1/0041; H04L 1/0009; B61L 27/0077; B61L 15/0072; B61L 25/02
See application file for complete search history.

(56) References Cited

U.S. PATENT DOCUMENTS

| | | | |
|---|---|---|---|
| 2002/0136164 A1 | 9/2002 | Fukuda et al. | |
| 2003/0187720 A1 | 10/2003 | Takada | |
| 2008/0151776 A1* | 6/2008 | Kure | H04L 1/0007 370/253 |
| 2008/0261597 A1* | 10/2008 | Hayama | H04W 36/30 455/436 |
| 2008/0304483 A1* | 12/2008 | Williams | H04L 1/0001 370/389 |
| 2009/0125778 A1 | 5/2009 | Uchida et al. | |
| 2011/0276677 A1 | 11/2011 | Osuga et al. | |
| 2012/0307662 A1* | 12/2012 | Puolakka | H04W 24/02 370/252 |
| 2013/0210344 A1* | 8/2013 | Horikawa | H04W 24/04 455/41.1 |
| 2014/0313902 A1* | 10/2014 | Bruner | H04W 28/0289 370/238 |
| 2014/0344640 A1* | 11/2014 | McLane | H04N 21/64715 714/752 |
| 2015/0181460 A1* | 6/2015 | Subramanian | H04W 28/0273 370/230 |
| 2015/0321682 A1* | 11/2015 | Ernst | G01S 17/06 356/73.1 |
| 2016/0207546 A1 | 7/2016 | Komura et al. | |
| 2016/0373210 A1* | 12/2016 | Gligoroski | G06F 17/18 |
| 2017/0041813 A1* | 2/2017 | Reed | H04W 4/02 |
| 2017/0220040 A1* | 8/2017 | London | A45C 5/145 |
| 2017/0325210 A1* | 11/2017 | Green | H04W 72/0453 |
| 2018/0227349 A1* | 8/2018 | Annamraju | H04L 65/80 |
| 2019/0049253 A1* | 2/2019 | Kitamura | G08G 1/0133 |
| 2019/0155278 A1* | 5/2019 | Idbrant | E02F 9/205 |

FOREIGN PATENT DOCUMENTS

| | | |
|---|---|---|
| JP | 2002-141937 A | 5/2002 |
| JP | 2003-288687 A | 10/2003 |
| JP | 2004-48152 A | 2/2004 |
| JP | 2004-153619 A | 5/2004 |
| JP | 2009-81753 A | 4/2009 |
| JP | 2009-159208 A | 7/2009 |
| JP | 2010-114944 A | 5/2010 |
| JP | 2011-91677 A | 5/2011 |
| JP | 2011-234320 A | 11/2011 |
| JP | 2012-119778 A | 6/2012 |
| JP | 2012-205116 A | 10/2012 |
| JP | 2014-123904 A | 7/2014 |
| JP | 2014-175765 A | 9/2014 |
| JP | 2015-231152 A | 12/2015 |
| JP | 2016-7906 A | 1/2016 |
| JP | 2016-163139 A | 9/2016 |
| JP | 2016-168876 A | 9/2016 |
| WO | WO 2007/069406 A1 | 6/2007 |
| WO | WO 2010/082523 A1 | 7/2010 |
| WO | WO 2014/188486 A1 | 11/2014 |

OTHER PUBLICATIONS

IEEE Computer Society, 802.11(TM)—2012—IEEE Standard for Information technology—Telecommunications and information exchange between systems Local and metropolitan area networks—Specific requirements, "Part 11: Wireless LAN Medium Access Control (MAC) and Physical Layer (PHY) Specifications", total of 2792 pages.
International Search Report for PCT/JP2017/030791 (PCT/ISA/210) dated Sep. 19, 2017.
Matsumoto et al., "Rate-Compatible QC-LDPC codes", SITA2006, Nov. 28-Dec. 1, 2006, pp. 387-390.

* cited by examiner

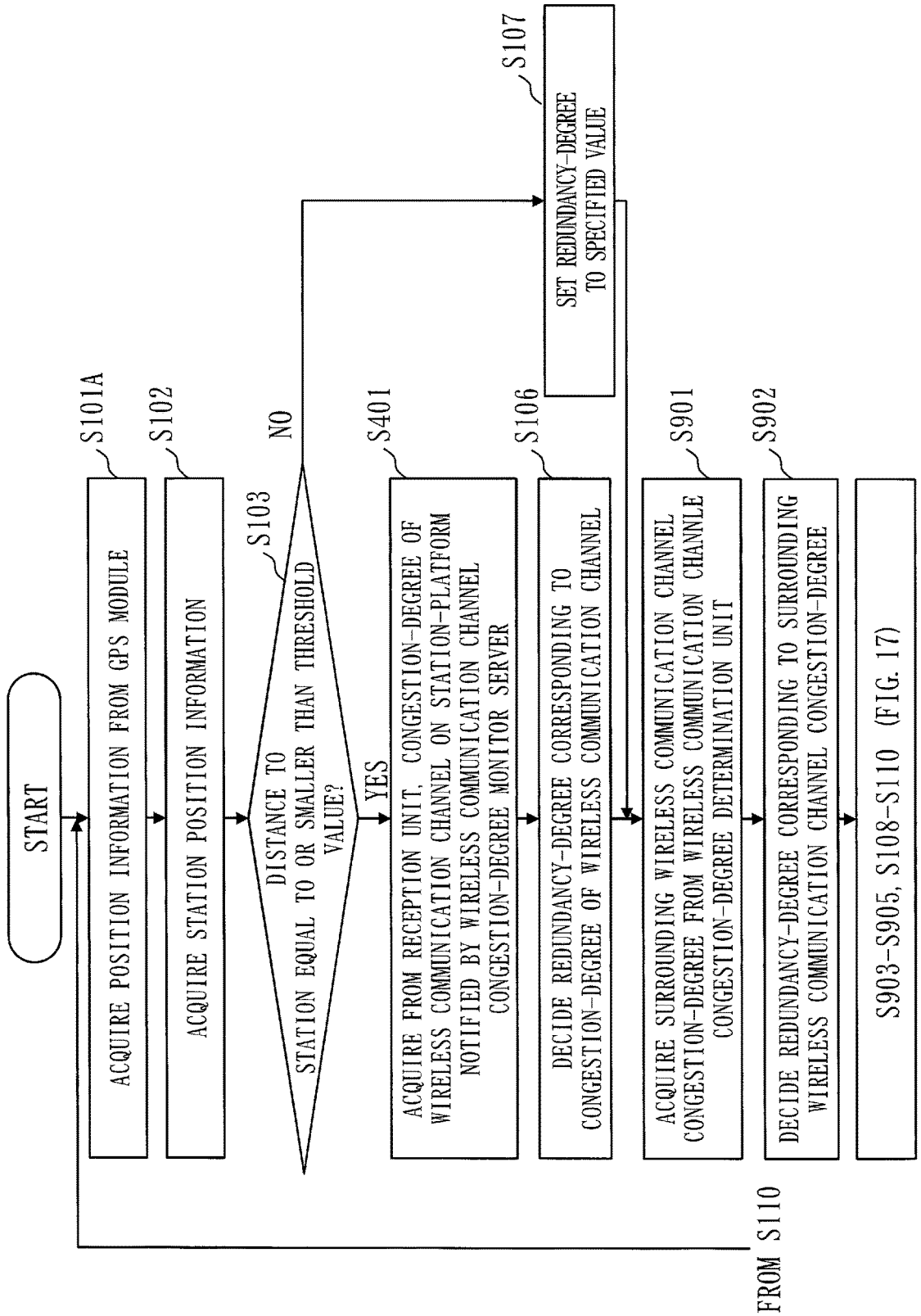

WIRELESS COMMUNICATION DEVICE, WIRELESS COMMUNICATION METHOD AND COMPUTER READABLE MEDIUM

TECHNICAL FIELD

The present invention relates to wireless communication.

BACKGROUND ART

In a digital signage system which delivers large-capacity data such as moving image contents to a display and the like, data delivery using a wireless LAN (Local Area Network) is being considered because installation costs can be reduced.

In the wireless LAN, there exist standards such as IEEE (the Institute of Electrical and Electronics Engineers, Inc.) 802.11a/b/g/n/ac. In the wireless LAN, communication is performed using mainly frequencies of 2.4 GHz band and 5 GHz band.

When delivering same data to a plurality of digital signage devices using the wireless LAN, it is more efficient to deliver the data simultaneously through multicasting than delivering the data to each digital signage device through unicasting.

However, a reception error might occur in wireless transmission. According to Non-Patent Literature 1, in multicasting of the wireless LAN, there is no function of retransmission when the reception error occurs. Therefore, multicasting in the wireless LAN cannot be applied directly to communication in which a lack of data is not allowed such as data delivery to a digital signage device.

As a countermeasure, there is a method in which each digital signage device notifies, in an application layer, a transmission terminal of a reception error occurrence point, and the transmission terminal retransmits the data. However, when the reception error occurrence point differs in each digital signage device, data to be retransmitted increases. As a result, system throughput is reduced.

Therefore, it is necessary to make the original data recoverable and reduce retransmission even when different partial data loss occurs in each digital signage device. For this purpose, it is considered that an erasure-correction code is applied to the original data as an error-correction code. As an example of the erasure-correction code, there is a method written in Non-Patent Literature 2.

In the erasure-correction code, the original data is divided into encode blocks each having a fixed length, and encoding is performed on a plurality of the encode blocks. By doing this, redundant data for recovering the data loss is generated. For example, when erasure-correction encoding is performed at an encoding rate of ⅓ on 180 encode blocks each having a data length of 1500 bytes, 360 redundant data blocks each having a data length of 1500 bytes are generated. At a reception side, a decoding process is possible if equal to or more than 180 data blocks are received out of 540 data blocks which are a sum of the original encode blocks and the redundant data blocks.

In a digital signage system installed in a train such as a train vision system of Non-Patent Literature 3, a congestion-degree of a wireless communication channel around the train fluctuates considerably along with travelling of the train. By fluctuation of the congestion-degree of the wireless communication channel, a reception error rate at each digital signage device fluctuates. Therefore, there is a case where data transmission becomes excessive compared to the fluctuating reception error rate, if the number of original encode blocks and redundant data blocks to be transmitted is fixed. In this case, a problem arises that system throughput is reduced.

As methods for dynamically coping with fluctuation of propagation characteristics caused by travelling, Patent Literature 1 and Patent Literature 2 disclose methods of changing error-correction schemes according to position information.

CITATION LIST

Patent Literature

Patent Literature 1: JP2011-091677 A
Patent Literature 2: JP2014-175765 A

Non-Patent Literature

Non-Patent Literature 1: IEEE Computer Society, 802.11™—2012—IEEE Standard for Information technology—Telecommunications and information exchange between systems Local and metropolitan area networks—Specific requirements Part 11: Wireless LAN Medium Access Control (MAC) and Physical Layer (PHY) Specifications Non-Patent Literature 2: W. Matsumoto et al, "Rate-Compatible QC-LDPC codes", SITA2006, Nov. 28-Dec. 1, 2006.

Non-Patent Literature 3: Masahito Chihira, Yukitoshi Inaba, "Latest Technologies and Future Prospects of Train Vision System", MITSUBISHI DENKI GIHO, September, 2016.

SUMMARY OF INVENTION

Technical Problem

In the methods disclosed in Patent Literature 1 and Patent Literature 2, the position information is notified from a reception terminal to a transmission terminal. Also, the transmission terminal estimates propagation loss between transmission and reception terminals, based on the position information. Then, the transmission terminal changes encoding schemes, based on the estimated propagation loss. However, in a system in which data transmission is performed from a transmission terminal placed inside the train to a digital signage device placed inside the train, even when the train travels, the propagation loss between transmission and reception terminals does not fluctuate. Therefore, a congestion-degree of a wireless communication channel around transmission and reception terminals fluctuates along with travelling of the train. Also, the congestion-degree of the wireless communication channel fluctuates depending on the number of wireless terminals passengers in the train or on the station-platform have. Therefore, the methods in Patent Literature 1 and Patent Literature 2 cannot solve the above-described problem in the digital signage system in the train.

The present invention is conceived in consideration of the above, and aims at absorbing fluctuation of a congestion-degree of a wireless communication channel around a train along with travelling of the train and improving system throughput.

Solution to Problem

A wireless communication device mounted on a train, which transmits delivery data, the wireless communication device includes, a redundancy-degree decision unit to decide a redundancy-degree of an erasure-correction code to be applied to the delivery data, when a distance between the wireless communication device and a next arrival station becomes equal to or smaller than a threshold value, the next arrival station being a station at which the train arrives next, based on a congestion-degree of a wireless communication channel around the next arrival station; and an encoding unit to encode the delivery data into an erasure-correction code at an encoding rate corresponding to the redundancy-degree decided by the redundancy-degree decision unit.

Advantageous Effects of Invention

According to the present invention, it is possible to absorb fluctuation of a congestion-degree of a wireless communication channel around a train along with travelling of the train, and improve system throughput.

BRIEF DESCRIPTION OF DRAWINGS

FIG. 21 is a flowchart illustrating an operational example of an encoding process unit of the delivery data transmission device according to Embodiment 5.

DESCRIPTION OF EMBODIMENTS

Embodiments of the present invention are described below, using diagrams. In descriptions and diagrams of the embodiments below, elements provided with same reference signs indicate the same elements or equivalent elements.

Embodiment 1

In the present embodiment, a delivery data transmission device mounted on a train estimates a congestion-degree of a wireless communication channel which fluctuates along with travelling of the train. Also, in the present embodiment, the delivery data transmission device causes the number of transmission of encode blocks and redundant data blocks of erasure-correction codes to fluctuate according to the congestion-degree, and improves system throughput.

Description of Configuration of Delivery Data Transmission Device 100A

Figure 1:
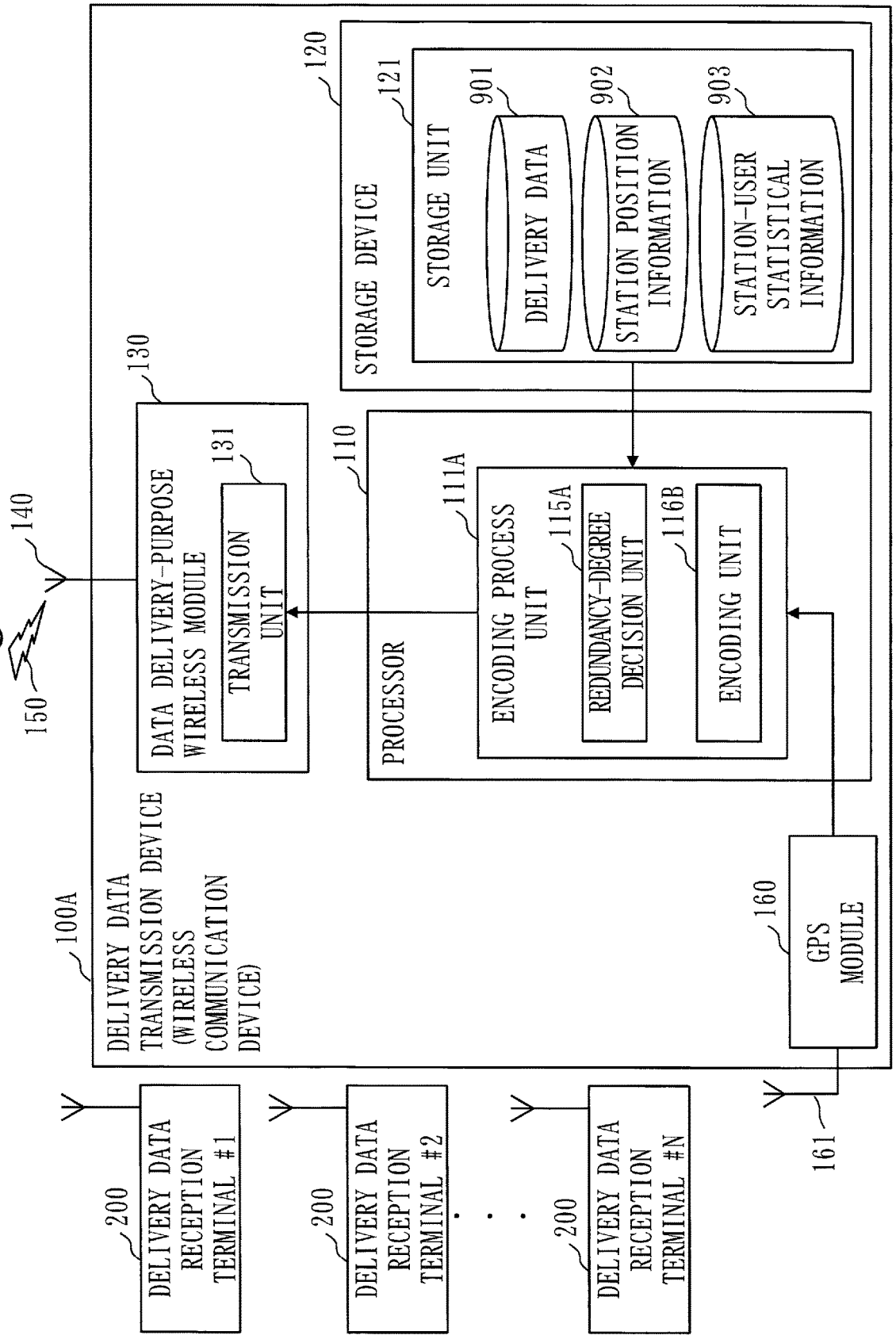
FIG. 1 is a diagram illustrating a configuration example of a delivery data transmission device according to Embodiment 1.

FIG. 1 is a diagram illustrating a configuration example of a delivery data transmission device 100A according to the present embodiment.

The delivery data transmission device 100A is mounted on a train. The delivery data transmission device 100A transmits delivery data 901 to a delivery data reception terminal 200.

The delivery data transmission device 100A includes hardware such as a processor 110, a storage device 120, a data delivery-purpose wireless module 130, a data delivery-purpose wireless module antenna 140, a GPS (Global Positioning System) module 160 and a GPS antenna 161.

The delivery data transmission device 100A corresponds to a wireless communication device. Also, operation performed by the delivery data transmission device 100A corresponds to a wireless communication method and a wireless communication program.

The processor 110 is connected with other hardware components via signal lines, and controls these other hardware components.

The processor 110 is an IC (Integrated Circuit) which performs processing. Specifically, the processor 110 is a CPU (Central Processing Unit).

The processor 110 executes a program for realizing a function of an encoding process unit 111A. The program for realizing the function of the encoding process unit 111A is stored in the storage device 120. The processor 110 reads out the program for realizing the function of the encoding process unit 111A from the storage device 120, executes the program, and realizes the function of the encoding process unit 111A described later.

The storage device 120 includes an auxiliary storage device and a memory. The auxiliary storage device is specifically a ROM (Read Only Memory), a flash memory or an HDD (Hard Disk Drive). The memory is specifically a RAM (Random Access Memory). A storage unit 121 is realized by the storage device 120. Specifically, the storage unit 121 is realized by the memory, but it may be realized by both of the auxiliary storage device and the memory.

As mentioned above, the program for realizing the function of the encoding process unit 111A is stored in the storage device 120.

The data delivery-purpose wireless module 130 includes a transmission unit 131 which transmits a wireless signal 150 via the data delivery-purpose wireless module antenna 140 to one or more delivery data reception terminals 200. The data delivery-purpose wireless module 130 may include a reception unit to receive a wireless signal via the data delivery-purpose wireless module antenna 140.

The GPS module 160 receives a GPS signal from a GPS satellite via the GPS antenna 161. Also, the GPS module 160 calculates a position of the delivery data transmission device 100A, and notifies the position information via the signal line to the encoding process unit 111A which operates in the processor 110.

The encoding process unit 111A includes a redundancy-degree decision unit 115A and an encoding unit 116B.

The redundancy-degree decision unit 115A decides a redundancy-degree of an erasure-correction code to be applied to the delivery data 901, when a distance between a next arrival station and the delivery data transmission device 100A becomes equal to or smaller than a threshold value, the next arrival station being a station at which the train arrives next, based on a congestion-degree of a wireless communication channel around the next arrival station.

The redundancy-degree decision unit 115A, for example, estimates the congestion degree of the wireless communication channel around the next arrival station, using statistical information on the number of users of the next arrival station. Then, the redundancy-degree decision unit 115A decides the redundancy-degree, based on the estimated congestion-degree of the wireless communication channel around the next arrival station.

Operation performed by the redundancy-degree decision unit 115A corresponds to a redundancy-degree decision process.

The encoding unit 116B encodes the delivery data 901 into the erasure-correction code at an encoding rate corresponding to the redundancy-degree decided by the redundancy-degree decision unit 115A.

Operation performed by the encoding unit 116B corresponds to an encoding process.

Description of Operation of Delivery Data Transmission Device 100A

Next, operation of the delivery data transmission device 100A according to the present embodiment is described with reference to FIG. 2. Operation illustrated in FIG. 2 is operation of the encoding process unit 111A.

Figure 2:
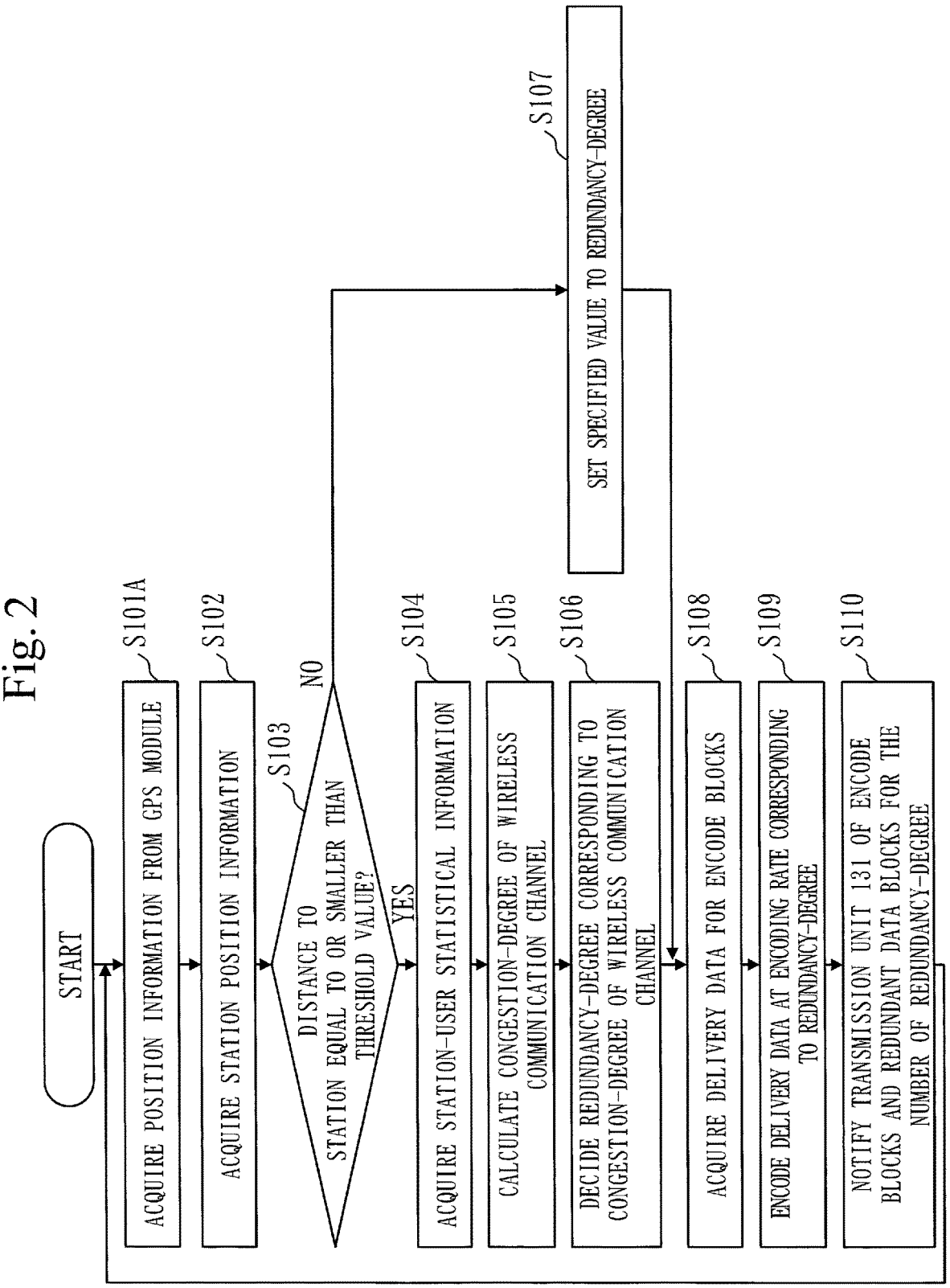
FIG. 2 is a flowchart illustrating an operational example of an encoding process unit of the delivery data transmission device according to Embodiment 1.

In step S101A of FIG. 2, the redundancy-degree decision unit 115A acquires position information of the delivery data transmission device 100A from the GPS module 160. The position information is specifically information on latitude and longitude.

In step S102 of FIG. 2, the redundancy-degree decision unit 115A acquires from the storage unit 121, station position information 902 of the next arrival station which is a station at which the train mounted with delivery data transmission device 100A stops or passes next. The station position information 902 of the next arrival station is specifically information on latitude and longitude, and is the position information of all stations in a route on which the train travels. Determination of the next arrival station may be performed only from the position information of the delivery data transmission device 100A. Also, determination of the next arrival station may be performed by retaining train operation information, which is not illustrated, in the storage unit 121 and by using the position information of the delivery data transmission device 100A and the train operation information.

In step S103 of FIG. 2, the redundancy-degree decision unit 115A compares the position information of the delivery data transmission device 100A with position information of the next arrival station, and calculates a distance from the next arrival station. The redundancy-degree decision unit 115A determines if the distance from the next arrival station is equal to or smaller than a threshold value, and when the distance from the next arrival station is equal to or smaller than the threshold value, the process proceeds to step S104. When the distance from the next arrival station is larger than the threshold value, the process proceeds to step S107. The threshold value is a distance at which influence by an interference wave from a wireless terminal existing on the next arrival station-platform emerges, and the threshold value varies depending on a wireless system to be used.

In step S104 of FIG. 2, the redundancy-degree decision unit 115A acquires station-user statistical information 903 of the next arrival station from the storage unit 121. The station-user statistical information 903 is specifically information on the number of station users for every day of a week and every time point. The station-user statistical information 903 is station-user statistical information of all stations of the route on which the train mounted with the delivery data transmission device 100A travels. Determination of the next arrival station may be performed only from the position information of the delivery data transmission device 100A. Also, determination of the next arrival station may be performed by retaining the train operation information, which is not illustrated, in the storage unit 121 and by using the position information of the delivery data transmission device 100A and the train operation information. The redundancy-degree decision unit 115A acquires current time from a time management unit, which is not illustrated, and acquires the number of users of the next arrival station at the current time. The time management unit may be a time management function provided by an OS (Operating System) operating on the processor 110 or other time management device.

In step S105 of FIG. 2, the redundancy-degree decision unit 115A calculates the congestion-degree of the wireless communication channel from the distance to the next arrival station calculated in step S103 and the number of station users acquired in step S104. The congestion-degree of the wireless communication channel is specifically an error rate of a wireless frame received by the delivery data reception terminal 200, and is calculated from a relation measured in advance between the number of station users and the frame error rate. As the number of station users increases, the frame error rate tends to increase.

In step S106 of FIG. 2, the redundancy-degree decision unit 115A decides the redundancy-degree of the erasure-correction code, based on the congestion-degree of the wireless communication channel calculated in step S105. That is, the redundancy-degree decision unit 115A decides the redundancy-degree of the erasure-correction code corresponding to the frame error rate. Specifically, the redundancy-degree, that is, the number of encode blocks and redundant data blocks is decided so that the delivery data is recoverable by the erasure-correction code in the delivery data reception terminal 200 even when a wireless frame error occurs at the frame error rate. The redundancy-degree corresponding to the frame error rate varies depending on the encoding scheme, the redundancy degree enabling the delivery data to be recoverable by the erasure-correction code. The redundancy-degree decision unit 115A holds as a table a relation between the frame error rate of the encoding scheme used by the delivery data transmission device 100A and the redundancy-degree which enables recovery probability to be equal to or larger than the threshold value which has been decided in advance. The redundancy-degree decision unit 115A refers to the table, and decides the redundancy-degree of the erasure-correction code applied to the delivery data 901. That is, the redundancy-degree decision unit 115A extracts from the table, the redundancy-degree corresponding to the frame error rate calculated as the congestion-degree of the wireless communication channel in step S105, and decides the redundancy-degree to be applied.

In step S107 of FIG. 2, the redundancy-degree decision unit 115A sets the redundancy-degree of the erasure-correction code, that is, the number of encode blocks and redundant data blocks, to the number decided in advance.

In step S108 of FIG. 2, the redundancy-degree decision unit 115A acquires, from the storage unit 121, the delivery data 901 for the number of encode blocks of the erasure-correction code. The number of encode blocks and a data size of one encode block vary depending on the encoding scheme.

In step S109 of FIG. 2, the encoding unit 116B performs encoding of the delivery data 901 at the encoding rate corresponding to the redundancy-degree decided in step S106 or S107. For example, when the number of encode blocks is 180 and the redundancy-degree is 1.5, the encoding unit 116B encodes at the encoding rate 1/2 to generate 180 redundant data blocks so that the total of encode blocks and redundant data blocks becomes equal to or more than 180×1.5=270 blocks.

In step S110 of FIG. 2, the encoding unit 116B notifies the transmission unit 131 of the encode blocks and the redundant data blocks from the encode blocks and the redundant data blocks generated in step S109 for the number of blocks corresponding to redundancy-degree decided in step S106 or S107. For example, when the number of encode blocks is 180 and the redundancy-degree is 1.5, the encoding unit 116B notifies the transmission unit 131 of 270 blocks which is a sum of encode blocks and redundant data blocks. The combination of the encode blocks and the redundant data blocks to be notified to the transmission unit 131 may be any combination as long as the sum is 270 blocks.

In step S110, the encode blocks and the redundant data blocks notified from the encoding unit 116B to the transmission unit 131 are modulated in the transmission unit 131 into a wireless frame corresponding to the data delivery-purpose wireless module 130. Also, the encode blocks and the redundant data blocks notified from the encoding unit 116B to the transmission unit 131 are transmitted by the transmission unit 131 to one or more delivery data reception terminals 200 from the data delivery-purpose wireless module antenna 140. The number of each of the encode block and the redundant data block transmitted in one wireless frame may be one. Also, a plurality of encode blocks and redundant data blocks may be transmitted together.

Description of Configuration of Delivery Data Reception Terminal 200

Figure 3:
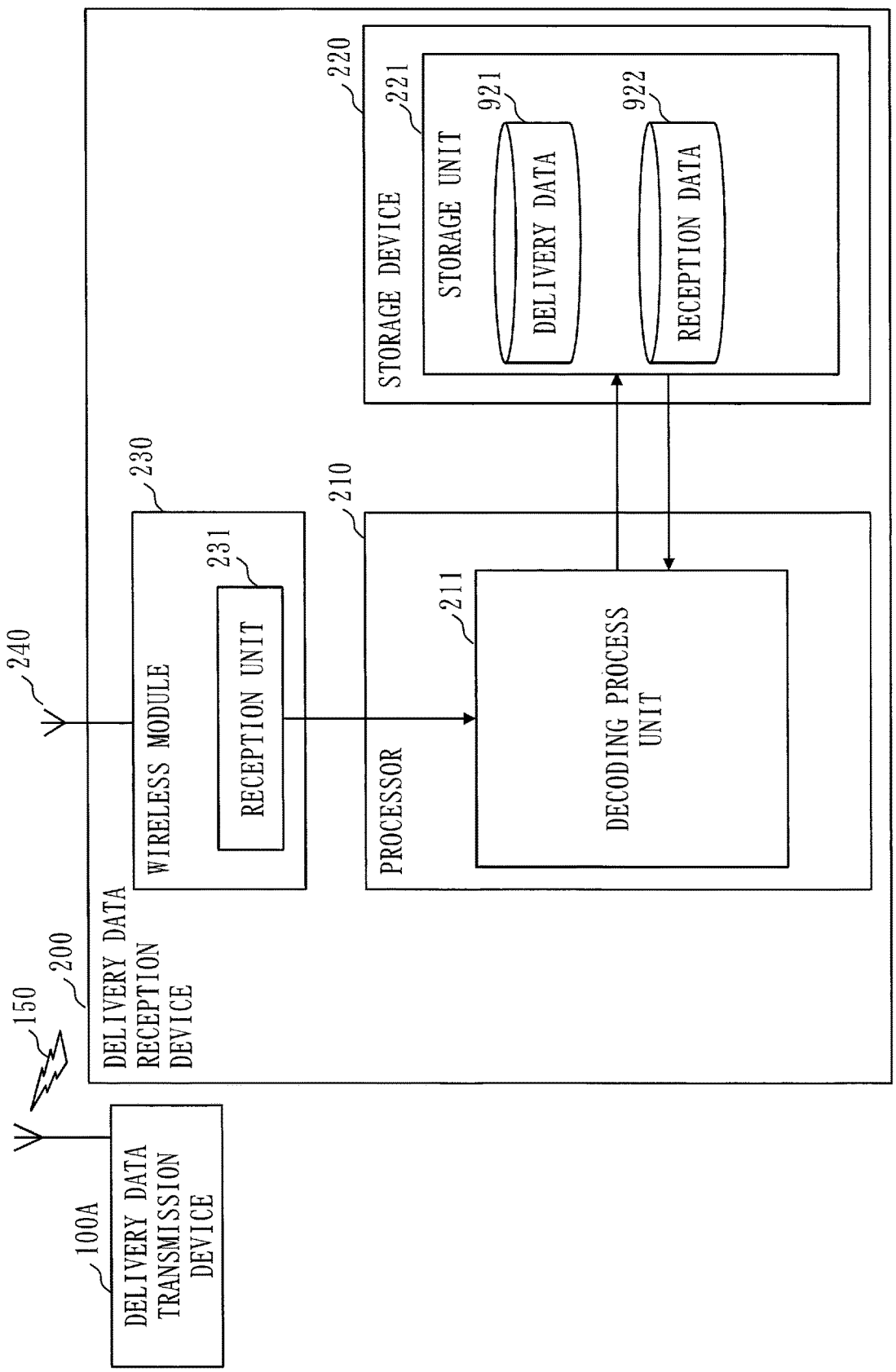
FIG. 3 is a diagram illustrating a configuration example of a delivery data reception terminal according to Embodiment 1.

FIG. 3 is a diagram illustrating a configuration example of the delivery data reception terminal 200 according to the present embodiment. The delivery data reception terminal 200 includes hardware such as a processor 210, a storage device 220, a wireless module 230 and a wireless module antenna 240. The processor 210 is connected with other hardware components via signal lines, and controls these other hardware components.

The processor 210 is an IC which performs processing. Specifically, the processor 210 is a CPU.

The processor 210 executes a program for realizing a function of a decoding process unit 211. The program for realizing the function of the decoding process unit 211 is stored in the storage device 220. The processor 210 reads out the program for realizing the function of the decoding process unit 211 from the storage device 220, executes the program, and realizes the function of the decoding process unit 211 described later.

The storage device 220 includes an auxiliary storage device and a memory. The auxiliary storage device is specifically a ROM, a flash memory or an HDD. The memory is specifically a RAM. A storage unit 221 is realized by the storage device 220. Specifically, the storage unit 221 is realized by the memory, but it may be realized by both of the auxiliary storage device and the memory.

As mentioned above, the storage device 220 stores the program for realizing the function of the decoding process unit 211.

The wireless module 230 includes a reception unit 231 to receive a wireless signal 150 via the wireless module antenna 240. The wireless module 230 may include a transmission unit to transmit a wireless signal via the wireless module antenna 240.

Description of Operation of Delivery Data Reception Terminal 200

Operation of the delivery data reception terminal 200 according to the present embodiment is described with reference to FIG. 4. Operation illustrated in FIG. 4 is operation of the decoding process unit 211.

Figure 4:
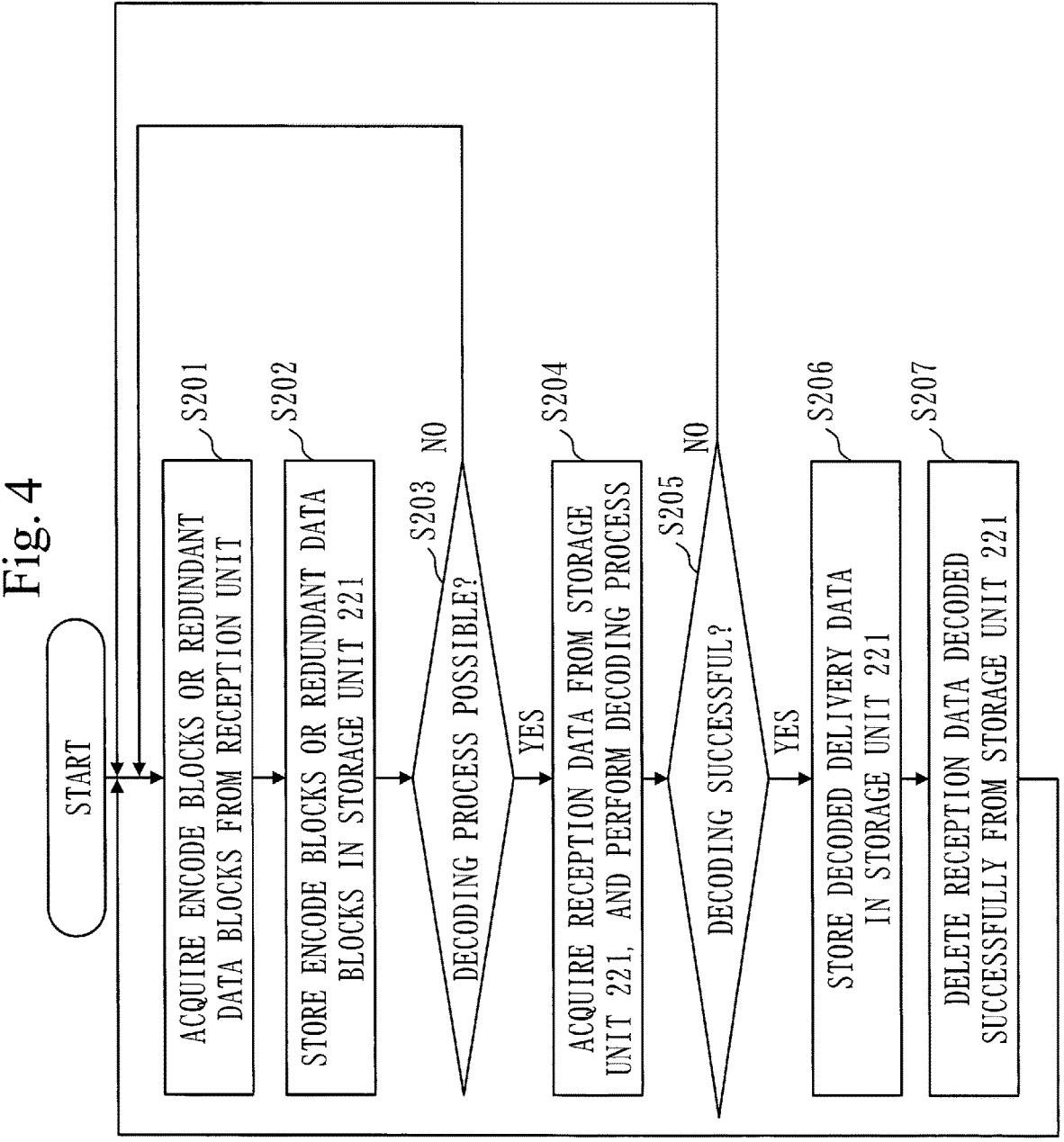
FIG. 4 is a flowchart illustrating an operational example of a decoding process unit of the delivery data reception terminal according to Embodiment 1.

In step S201 of FIG. 4, the decoding process unit 211 acquires encode blocks or redundant data blocks the reception unit 231 received from the delivery data transmission device 100A.

In step S202 of FIG. 4, the decoding process unit 211 stores the encode blocks or the redundant data blocks acquired in step S201 in reception data 922 of the storage unit 221.

In step S203 of FIG. 4, the decoding process unit 211 checks if the sum of the encode blocks and the redundant data blocks stored in the reception data 922 of the storage unit 221 is more than the number allowed for decoding. When the sum of the encode blocks and the redundant data blocks is the number at which decoding is possible, the decoding process unit 211 proceeds to step S204. When the sum is the number at which decoding is not possible, the decoding process unit 211 returns to step S201. The sum of the encode blocks and the redundant data blocks at which decoding is possible is equal to the number of the encode blocks when the erasure-correction-encoding process (step S109 of FIG. 2) is performed in the delivery data transmission device 100A. For example, in a case where erasure-correction-encoding is performed on 180 encode blocks, a decoding process is possible if 180 or more encode blocks and redundant data blocks are received in total. At this time, a combination of the encode blocks and the redundant data blocks may be any combination.

In step S204 of FIG. 4, the decoding process unit 211 acquires the encode blocks and the redundant data blocks in the reception data 922 from the storage unit 221. Then, the decoding process unit 211 performs a decoding process on the encode blocks and the redundant data blocks.

In step S205 of FIG. 4, the decoding process unit 211 determines if the decoding process in step S204 is successful. If the decoding is successful, the decoding process unit 211 proceeds to step S206. If the decoding is unsuccessful, the decoding process unit 211 returns to step S201.

In step S206 of FIG. 4, the decoding process unit 211 stores the delivery data decoded from the encode blocks and the redundant data blocks in step S204 in delivery data 921 of the storage unit 221.

In step S207 of FIG. 4, the decoding process unit 211 deletes the encode blocks and the redundant data blocks used for the decoding process in step S204 from the reception data 922 of the storage unit 221.

Description of Effect of Embodiment

In the present embodiment, as described above, the delivery data transmission device 100A estimates the congestion-degree of the wireless communication channel around the station. Also, the delivery data transmission device 100A dynamically changes the redundancy-degree of the erasure-correction code corresponding to the congestion-degree of the wireless communication channel, and transmits to the delivery data reception terminal 200. By doing this, system throughput of data delivery can be improved.

Embodiment 2

Description of Configuration of Delivery Data Transmission Device 100B

Figure 5:
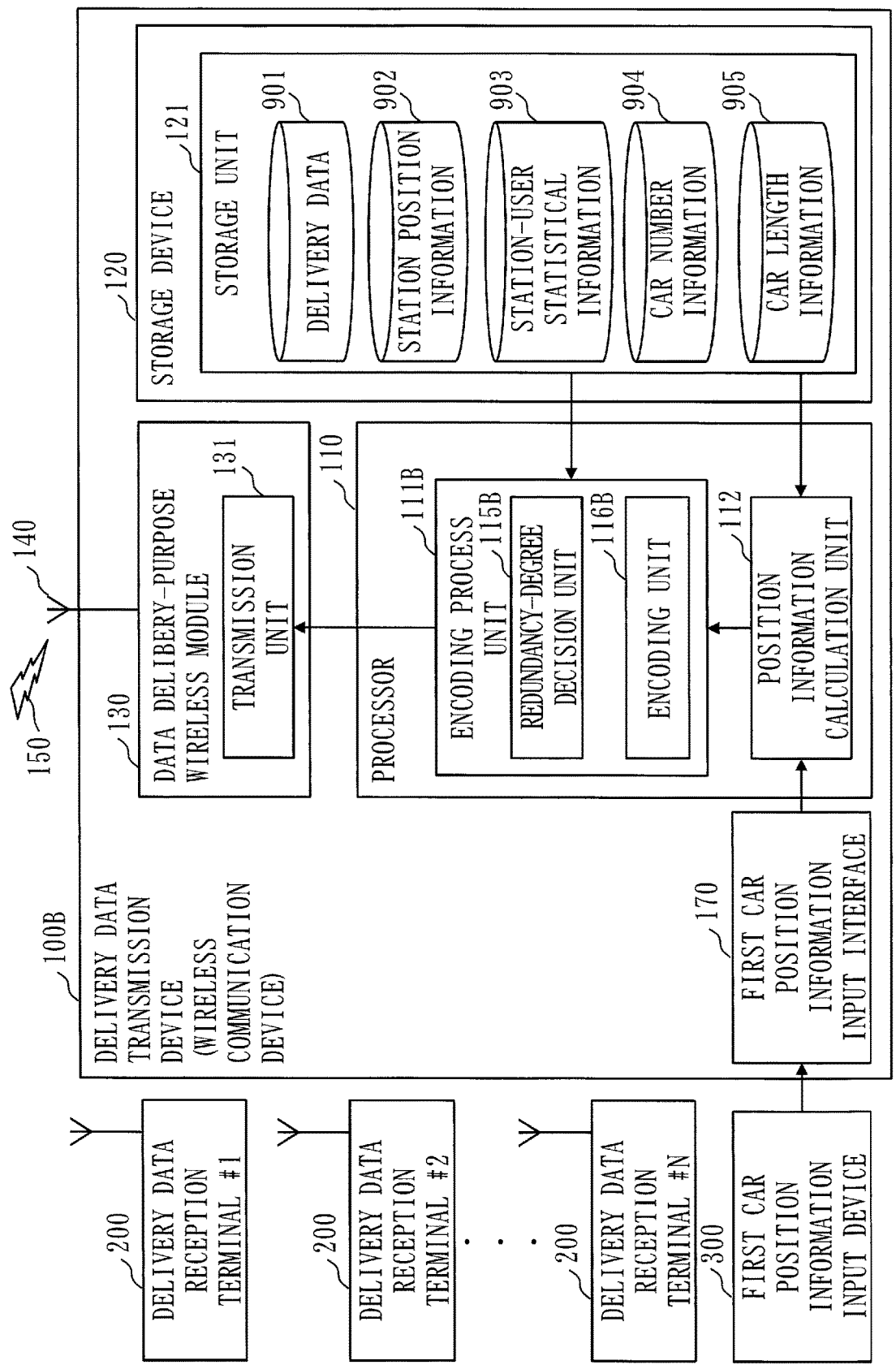
FIG. 5 is a diagram illustrating a configuration example of a delivery data transmission device according to Embodiment 2.

FIG. 5 is a diagram illustrating a configuration example of a delivery data transmission device 100B according to the present embodiment. The delivery data transmission device 100B includes hardware such as a processor 110, a storage device 120, a data delivery-purpose wireless module 130, a data delivery-purpose wireless module antenna 140 and a first car position information input interface 170.

Hardware components of the delivery data transmission device 100B except for the first car position information input interface 170 are the same as those of the delivery data transmission device 100A of Embodiment 1.

The delivery data transmission device 100B also corresponds to a wireless communication device. Also, operation performed by the delivery data transmission device 100B corresponds to a wireless communication method and a wireless communication program.

Delivery data reception terminals 200 in FIG. 5 are the same as those in Embodiment 1.

The processor 110 is connected with other hardware components via signal lines, and controls these other hardware components.

In the present embodiment, the processor 110 executes programs for realizing functions of an encoding process unit 111B and a position information calculation unit 112. The programs for realizing functions of the encoding process unit 111B and the position information calculation unit 112 are stored in the storage device 120. The processor 110 reads out the programs for realizing functions of the encoding process unit 111B and the position information calculation unit 112 from the storage device 120, executes the programs, and realizes functions of the encoding process unit 111B and the position information calculation unit 112 described later.

The first car position information input interface 170 is an Ethernet (a registered trademark) terminal or an USB (Universal Serial Bus) terminal. The first car position information input interface 170 receives position information of the first car which is a specific point of a train mounted with the delivery data transmission device 100B, from an external first car position information input device 300. The external first car position information input device 300 may be an operation management device of the train, or may be the delivery data transmission device 100A of Embodiment 1 mounted on the first car.

The position information calculation unit 112 receives position information of the first car of the train on which the delivery data transmission device 100B is mounted, from the first car position information input interface 170. Then, the position information calculation unit 112 specifies a current position of the delivery data transmission device 100B, based on a distance between the first car of the train and the delivery data transmission device 100B and a current position of the first car.

A redundancy-degree decision unit 115B decides a redundancy-degree of an erasure-correction code to be applied to delivery data 901 when a distance between the current position of the delivery data transmission device 100B specified by the position information calculation unit 112 and the next arrival station becomes equal to or smaller than a threshold value. The method of the redundancy-degree decision unit 115B for deciding the redundancy-degree is the same as the method of the redundancy-degree decision unit 115A for deciding the redundancy-degree in Embodiment 1.

An encoding unit 116B encodes the delivery data 901 into the erasure-correction code at an encoding rate corresponding to the redundancy-degree decided by the redundancy-degree decision unit 115B.

Description of Operation of Delivery Data Transmission Device 100B

Figure 6:
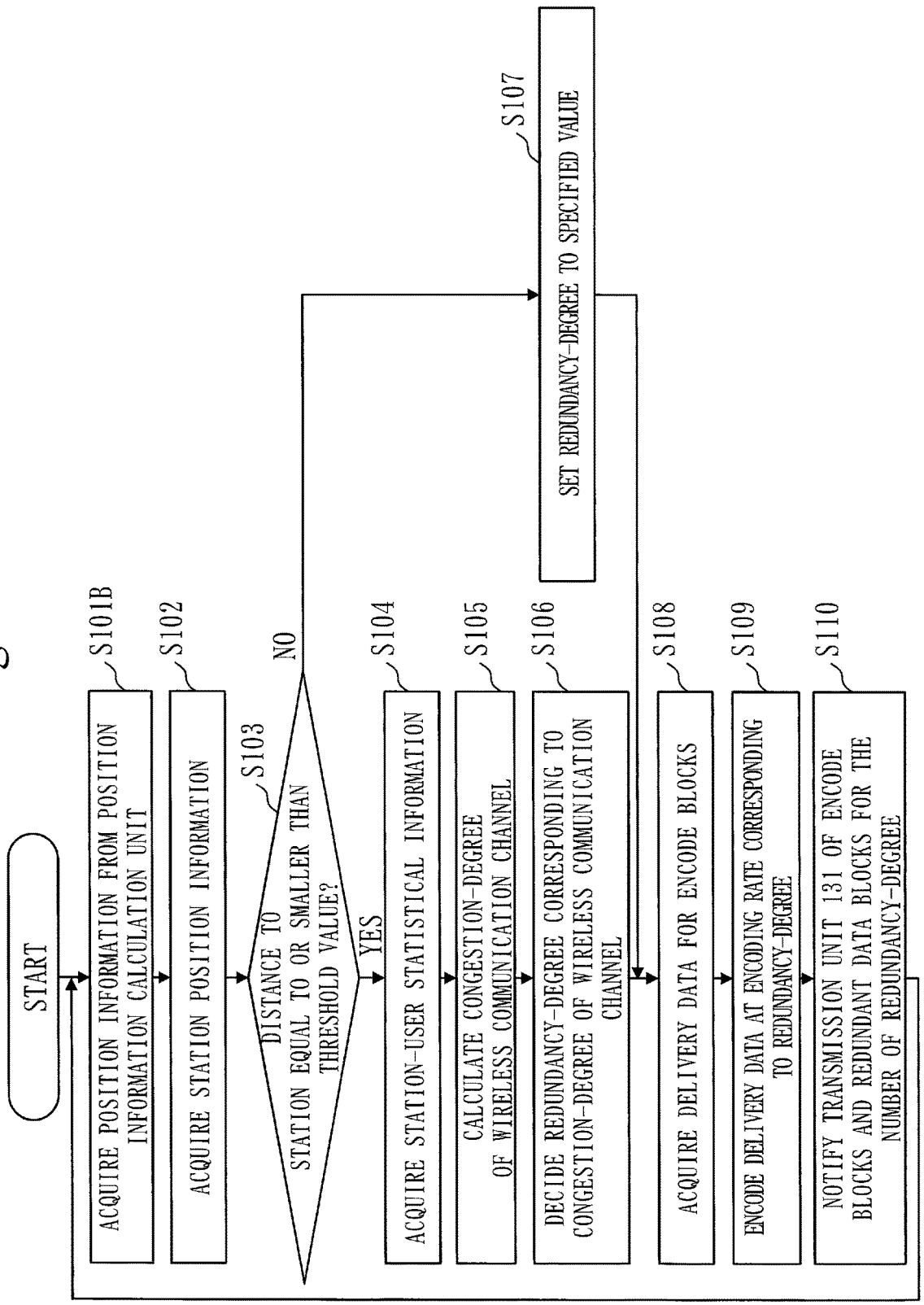
FIG. 6 is a flowchart illustrating an operational example of an encoding process unit of the delivery data transmission device according to Embodiment 2.

Operation of the delivery data transmission device 100B according to the present embodiment is described with reference to FIG. 6 and FIG. 7. Operation illustrated in FIG. 6 is operation of the encoding process unit 111B. The operation of the encoding process unit 111B is the same as the operation of the encoding process unit 111A in Embodiment 1 (FIG. 2), except for step S101B. Operation illustrated in FIG. 7 is operation of the position information calculation unit 112.

In step S101B of FIG. 6, the redundancy-degree decision unit 115B acquires position information of the car mounted with the delivery data transmission device 100B, from the position information calculation unit 112. The position information is specifically information on latitude and longitude.

Figure 7:
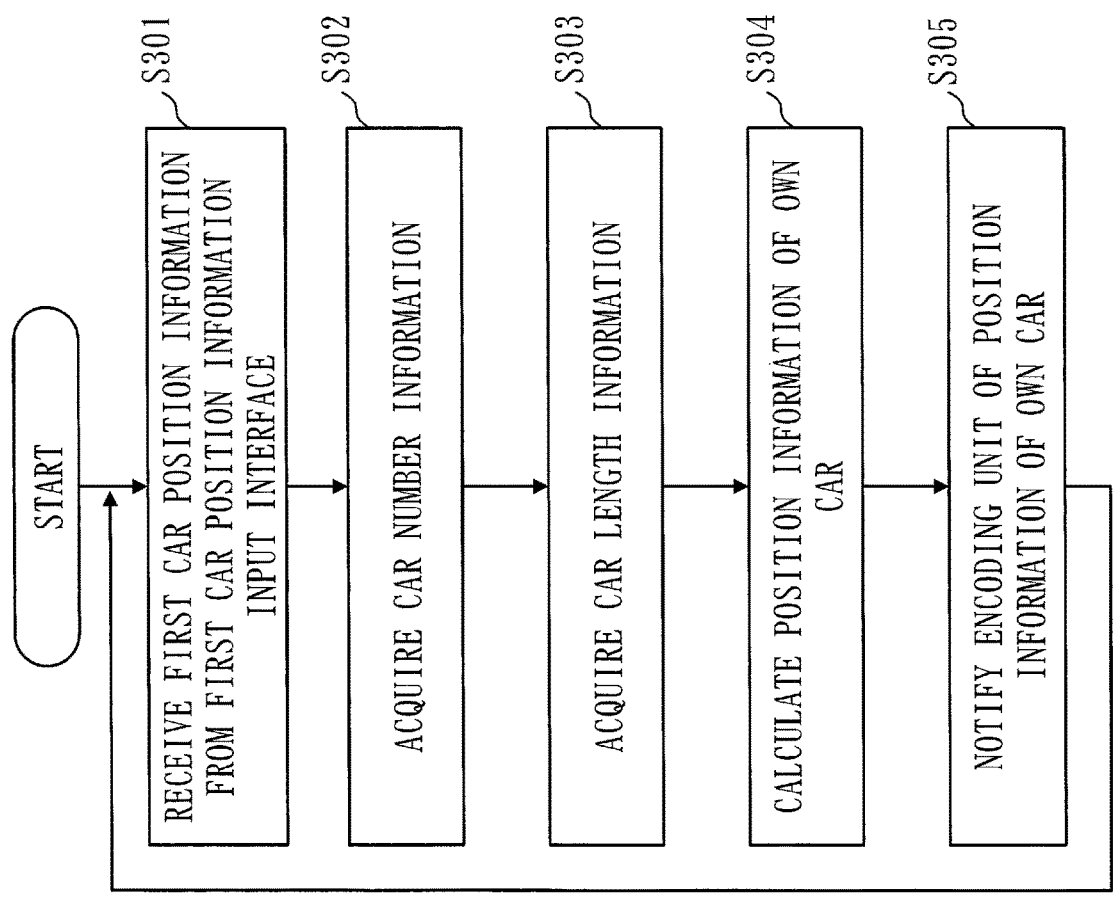
FIG. 7 is a flowchart illustrating an operational example of a position information calculation unit of the delivery data transmission device according to Embodiment 2.

In step S301 of FIG. 7, the position information calculation unit 112 receives the position information of the first car of the train mounted with the delivery data transmission device 100B, from the first car position information input interface 170. The position information of the first car is specifically information on latitude and longitude.

In step S302 of FIG. 7, the position information calculation unit 112 acquires car number information 904 on the car mounted with the delivery data transmission device 100B, from the storage unit 121. The car number information is specifically a car number on the premise that a foremost car is the first car.

In step S303 of FIG. 7, the position information calculation unit 112 acquires car length information 905 on the train mounted with the delivery data transmission device 100B, from the storage unit 121. The car length information is specifically a length of each car of the train. The car length information may include an installation position of the delivery data transmission device 100B inside the car.

In step S304 of FIG. 7, the position information calculation unit 112 calculates position information of the own car from the car number information acquired in step S302 and the car length information acquired in step S303. For example, if the car mounted with delivery data transmission device 100B is the third car, and each car length is 20 m, the position information of the own car is 20×3=60 m. Also, if the car length information includes the installation position of the delivery data transmission device 100B inside the car, the installation position inside the car is added to the calculated position information of the own car.

In step S305 of FIG. 7, the position information calculation unit 112 notifies the encoding process unit 111B of the position information of the own car calculated in step S304.

Description of Effect of Embodiment

In the present embodiment, as described above, position information of the own car can be calculated by receiving position information of the first car from the outside even if the delivery data transmission device 100B does not include a GPS module. Also, the redundancy-degree of the erasure-correction code can be changed dynamically corresponding to the congestion-degree of the wireless communication channel. Therefore, according to the present embodiment, system throughput of data delivery can be improved.

Embodiment 3

Description of Configuration of Delivery Data Transmission Device 100A-2

Figure 8:
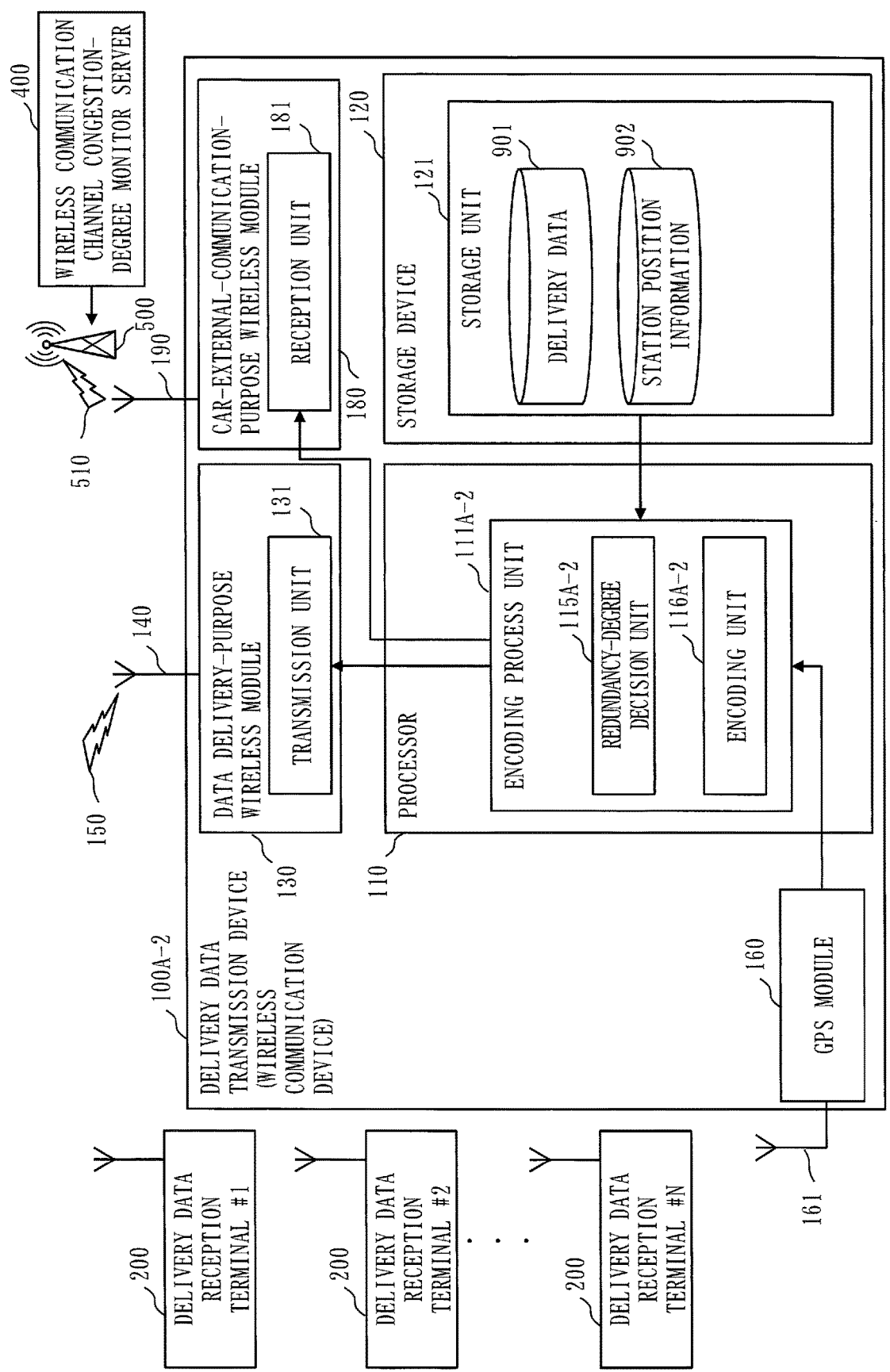
FIG. 8 is a diagram illustrating a configuration example of a delivery data transmission device according to Embodiment 3.

FIG. 8 is a diagram illustrating a configuration example of a delivery data transmission device 100A-2 according to the present embodiment.

The delivery data transmission device 100A-2 includes hardware such as a processor 110, a storage device 120, a data delivery-purpose wireless module 130, a data delivery-purpose wireless module antenna 140, a GPS module 160, a GPS antenna 161, a car-external-communication-purpose wireless module 180 and a car-external-communication-purpose wireless module antenna 190. Hardware components of the delivery data transmission device 100A-2 except for the car-external-communication-purpose wireless module 180 and the car-external-communication-purpose wireless module antenna 190 are the same as those of the delivery data transmission device 100A in Embodiment 1.

The delivery data transmission device 100A-2 also corresponds to a wireless communication device. Also, operation performed by the delivery data transmission device 100A-2 corresponds to a wireless communication method and a wireless communication program.

Delivery data reception terminals 200 in FIG. 8 are the same as those in Embodiment 1.

The processor 110 are connected with other hardware components via signal lines, and controls these other hardware components.

In the present embodiment, the processor 110 executes a program for realizing a function of an encoding process unit 111A-2. The program for realizing the function of the encoding process unit 111A-2 is stored in the storage device 120. The processor 110 reads out the program for realizing the function of the encoding process unit 111A-2 from the storage device 120, executes the program, and realizes the function of the encoding process unit 111A-2 described later.

The car-external-communication-purpose wireless module 180 includes a reception unit 181 to receive a wireless signal 510 from a wireless communication base station 500 outside the train, via the car-external-communication-purpose wireless module antenna 190. For example, the car-external-communication-purpose wireless module 180 is a wireless module which is compliant to mobile communication standards such as 3G, LTE (Long Term Evolution) (registered trademark) and WiMAX (registered trademark). The wireless communication base station 500 is a base station of mobile communication standards such as 3G, LTE and WiMAX. The car-external-communication-purpose wireless module 180 may include a transmission unit to transmit a wireless signal via the car-external-communication-purpose wireless module antenna 190.

A redundancy-degree decision unit 115A-2 acquires the congestion-degree of the wireless communication channel around the next arrival station from a wireless communication channel congestion-degree monitor server 400 which is an external device, via the car-external-communication-purpose wireless module 180. Also, the redundancy-degree decision unit 115A-2 decides the redundancy-degree, based on the acquired congestion-degree of the wireless communication channel around the next arrival station. The redundancy-degree decision method of the redundancy-degree decision unit 115A-2 is the same as the redundancy-degree decision method of the redundancy-degree decision unit 115A in Embodiment 1.

An encoding unit 116A-2 encodes delivery data 901 into an erasure-correction code at an encoding rate corresponding to the redundancy-degree decided by the redundancy-degree decision unit 115A.

Description of Operation of Delivery Data Transmission Device 100A-2

Figure 9:
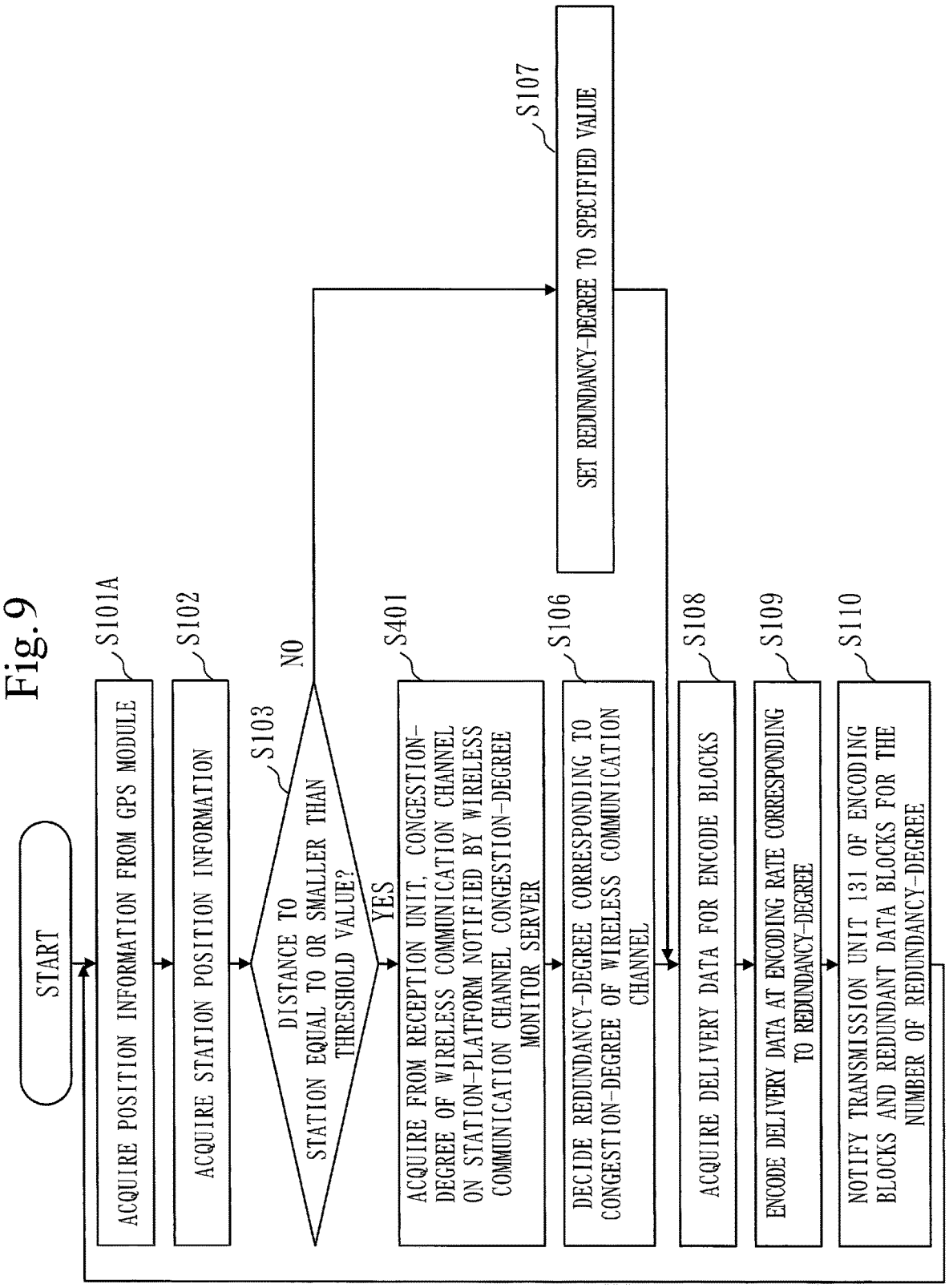
FIG. 9 is a flowchart illustrating an operational example of an encoding process unit of the delivery data transmission device according to Embodiment 3.

Operation of the delivery data transmission device 100A-2 according to the present embodiment is described with reference to FIG. 9. Operation illustrated in FIG. 9 is operation of the encoding process unit 111A-2. Steps S101A, S102, S103, and S106-S110 in FIG. 9 are the same as those of the encoding process unit 111A of the delivery data transmission device 100A in Embodiment 1 (FIG. 2).

In step S401 of FIG. 9, the redundancy-degree decision unit 115A-2 acquires, from the reception unit 181 of the car-external-communication-purpose wireless module 180, congestion-degree information of the wireless communication channel around the next arrival station-platform received from the wireless communication channel congestion-degree monitor server 400 via the wireless communication base station 500. The redundancy-degree decision unit 115A-2 may notify the wireless communication channel congestion-degree monitor server 400 of the next arrival station-platform based on position information of the delivery data transmission device 100A-2, and may acquire congestion-degree information of the wireless communication channel of the corresponding station-platform. Also, the redundancy-degree decision unit 115A-2 may select congestion-degree information of the wireless communication channel of the station platform to be notified by the wireless communication channel congestion-degree monitor server 400 based on operation information of the train.

Description of Configuration of Wireless Communication Channel Congestion-Degree Monitor Server 400

Figure 10:
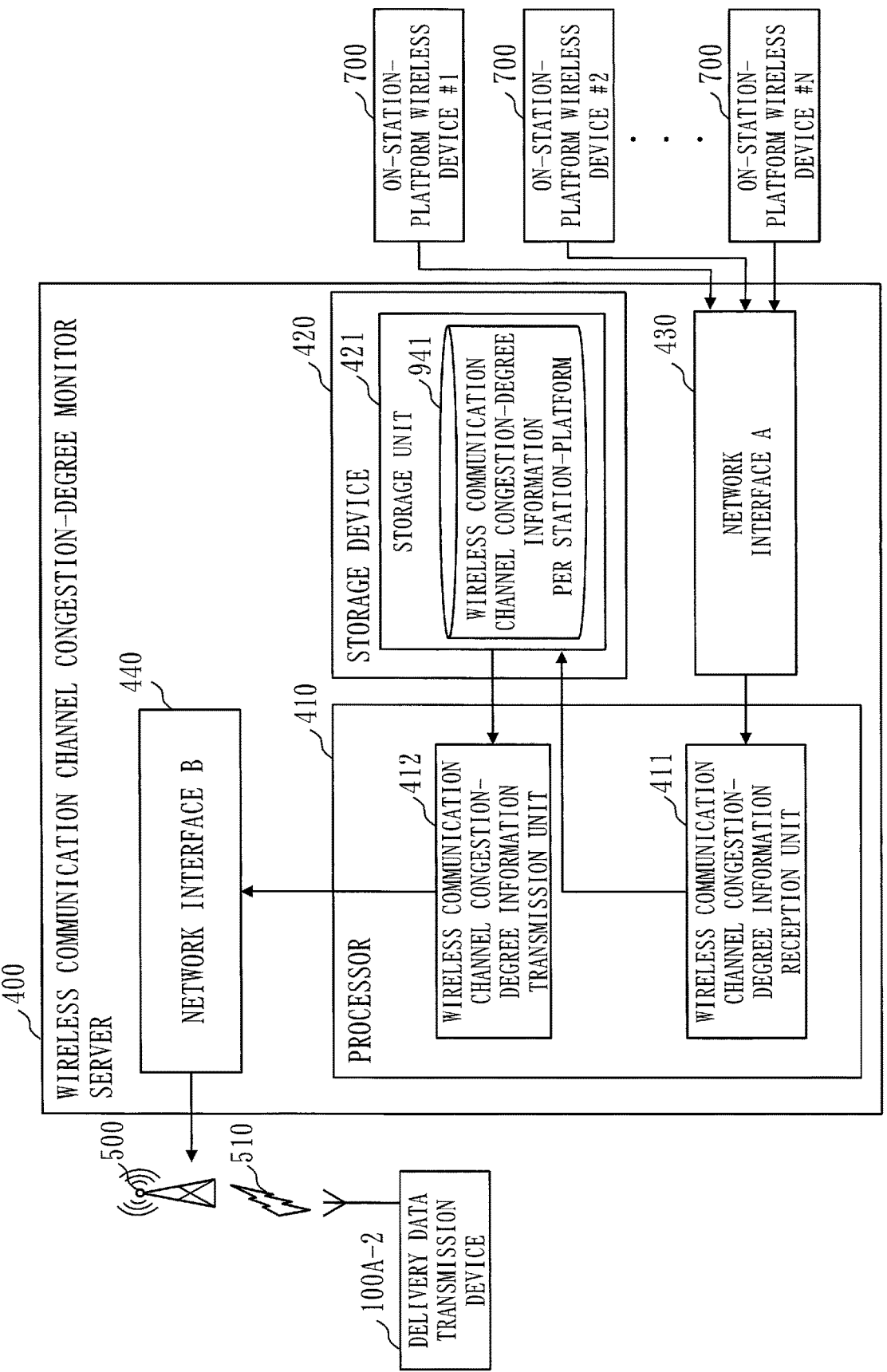
FIG. 10 is a diagram illustrating a configuration example of a wireless communication channel congestion-degree monitor server according to Embodiment 3.

FIG. 10 is a diagram illustrating a configuration example of the wireless communication channel congestion-degree monitor server 400 according to the present embodiment. The wireless communication channel congestion-degree monitor server 400 includes hardware such as a processor 410, a storage device 420, a network interface A430 and a network interface B440. The processor 410 is connected with other hardware components via signal lines, and controls these other hardware components.

The processor 410 is an IC which performs processing. The processor 410 is specifically a CPU.

The processor 410 executes programs for realizing functions of a wireless communication channel congestion-degree information reception unit 411 and a wireless communication channel congestion-degree information transmission unit 412. The programs for realizing functions of the wireless communication channel congestion-degree information reception unit 411 and the wireless communication channel congestion-degree information transmission unit 412 are stored in the storage device 420. The processor 410 reads out the programs for realizing functions of the wireless communication channel congestion-degree information reception unit 411 and the wireless communication channel congestion-degree information transmission unit 412 from the storage device 420. Then, the processor 410 executes the programs, and realizes functions of the wireless communication channel congestion-degree information reception unit 411 and the wireless communication channel congestion-degree information transmission unit 412 described later.

The storage device 420 includes an auxiliary storage device and a memory. The auxiliary storage device is specifically a ROM, a flash memory or an HDD. The memory is specifically a RAM. A storage unit 421 is realized by the storage device 420. Specifically, the storage unit 421 is realized by the memory, but may be realized by both of the auxiliary storage device and the memory.

As described above, the storage device 420 stores the programs for realizing functions of the wireless communication channel congestion-degree information reception unit 411 and the wireless communication channel congestion-degree information transmission unit 412.

A network interface A430 is a network interface such as an Ethernet terminal. The interface A430 is connected to one or more on-station-platform wireless devices 700 via a network. The network interface A430 receives, from one or more on-station-platform wireless devices 700, congestion-degree information on the wireless communication channel per station-platform.

A network interface B440 is a network terminal such as an Ethernet terminal. The network interface B440 is connected to the wireless communication base station 500 via a network. The network interface B440 transmits the congestion-degree information on the wireless communication channel of the station-platform via the wireless communication base station 500 to the delivery data transmission device 100A-2.

Description of Operation of Wireless Communication Channel Congestion-Degree Monitor Server 400

Figure 11:
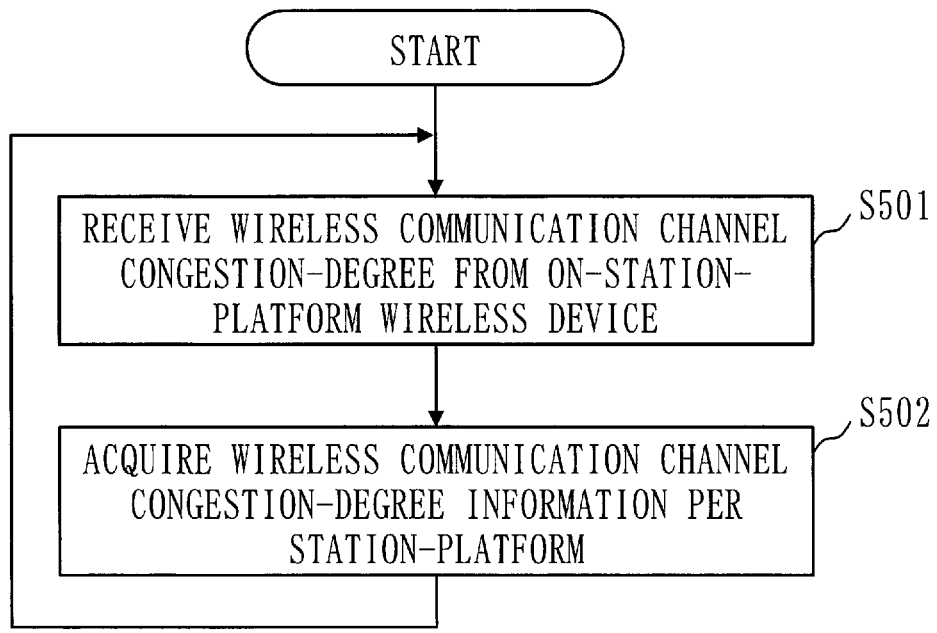
FIG. 11 is a flowchart illustrating an operational example of a wireless communication channel congestion-degree information reception unit of the wireless communication channel congestion-degree monitor server according to Embodiment 3.

Operation of the wireless communication channel congestion-degree monitor server 400 according to the present embodiment is described with reference to FIG. 11 and FIG. 12. Operation illustrated in FIG. 11 is operation of a wireless communication channel congestion-degree information reception unit 411. Operation illustrated in FIG. 12 is operation of a wireless communication channel congestion-degree information transmission unit 412.

In step S501 of FIG. 11, the wireless communication channel congestion-degree information reception unit 411 receives the congestion-degree of the wireless communication channel on the station-platform and identification information of an on-station-platform wireless device 700, from the on-station-platform wireless device 700 via the network interface A430. The congestion-degree of the wireless communication channel is specifically a wireless frame error rate. The identification information of the on-station-platform wireless device 700 may be any information which can identify a station and a platform.

In step S502 of FIG. 11, the wireless communication channel congestion-degree information reception unit 411 updates wireless communication channel congestion-degree information of the station-platform in wireless communication channel congestion-degree information per station-platform 941 stored in the storage unit 421. More specifically, the wireless communication channel congestion-degree information reception unit 411 updates the wireless communication channel congestion-degree information of the station-platform corresponding to the identification information of the on-station-platform wireless device 700 received from the on-station-platform wireless device 700 in step S501.

Figure 12:
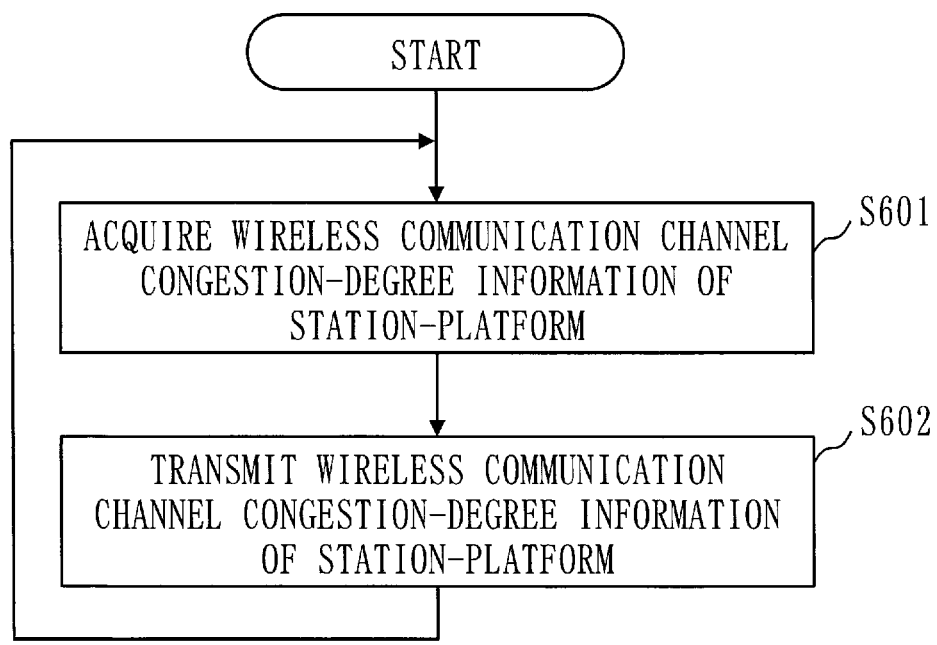
FIG. 12 is a flowchart illustrating an operational example of a wireless communication channel congestion-degree information transmission unit of the wireless communication channel congestion-degree monitor server according to Embodiment 3.

In step S601 of FIG. 12, the wireless communication channel congestion-degree information transmission unit 412 acquires the wireless communication channel congestion-degree information per station-platform 941 from the storage unit 421. The wireless communication channel congestion-degree information transmission unit 412 may acquire the wireless communication channel congestion-degree information per station-platform 941 specified by the delivery data transmission device 100A-2. Also, the wireless communication channel congestion-degree information transmission unit 412 may determine the station the train mounted with delivery data transmission device 100A-2 being a transmission destination stops at or passes by next, based on the operation information, and may acquire the congestion-degree of the wireless communication channel of the corresponding station as the wireless communication channel congestion-degree information per station-platform 941.

In step S602 of FIG. 12, the wireless communication channel congestion-degree information transmission unit 412 transmits the wireless communication channel congestion-degree information per station-platform 941 acquired in step S601 to the delivery data transmission device 100A-2 via the network interface B440 and the wireless communication base station 500.

Description of Configuration of
On-Station-Platform Wireless Device 700

Figure 13:
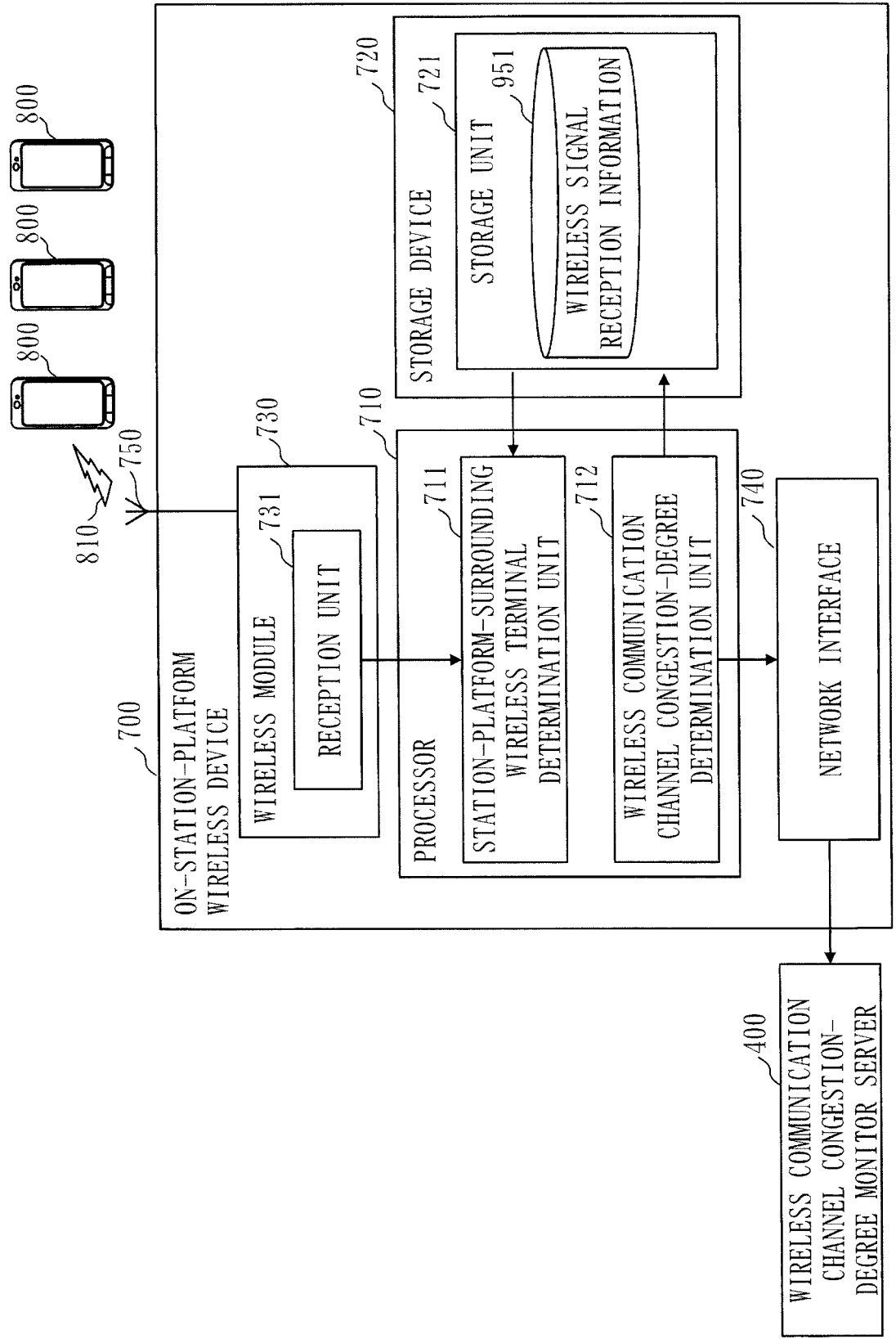
FIG. 13 is a diagram illustrating a configuration example of an on-station-platform wireless device according to Embodiment 3.

FIG. 13 is a diagram illustrating a configuration example of the on-station-platform wireless device 700 according to the present embodiment. The on-station-platform wireless device 700 includes hardware such as a processor 710, a storage device 720, a wireless module 730, a network interface 740 and an antenna 750. The processor 710 is connected with other hardware components via signal lines, and controls these other hardware components.

The processor 710 is an IC which performs processing. The processor 710 is specifically a CPU.

The processor 710 executes programs for realizing functions of a station-platform-surrounding wireless terminal determination unit 711 and a wireless communication channel congestion-degree determination unit 712. The programs for realizing functions of the station-platform-surrounding wireless terminal determination unit 711 and the wireless communication channel congestion-degree determination unit 712 are stored in the storage device 720. The processor 710 reads out the programs for realizing functions of the station-platform-surrounding wireless terminal determination unit 711 and the wireless communication channel congestion-degree determination unit 712 from the storage device 720. Also, the processor 710 executes the programs, and realizes functions of the station-platform-surrounding wireless terminal determination unit 711 and the wireless communication channel congestion-degree determination unit 712 described later.

The storage device 720 includes an auxiliary storage device and a memory. The auxiliary storage device is specifically a ROM, a flash memory or an HDD. The memory is specifically a RAM. The storage unit 721 is realized by the storage device 720. Specifically, the storage unit 721 is realized by the memory, but may be realized by both of the auxiliary storage device and the memory.

The wireless module 730 includes a reception unit 731 to receive a wireless signal 810 transmitted from one or more wireless terminals 800 around the station-platform via the antenna 750. The wireless module 730 may include a transmission unit to transmit a wireless signal via the antenna 750.

The network interface 740 is a network interface such as an Ethernet terminal. The network interface 740 is connected to the wireless communication channel congestion-degree monitor server 400 via a network. The network interface 740 transmits the congestion-degree information of the wireless communication channel of the station-platform to the wireless communication channel congestion-degree monitor server 400.

Description of Operation of On-Station-Platform
Wireless Device 700

Figure 14:
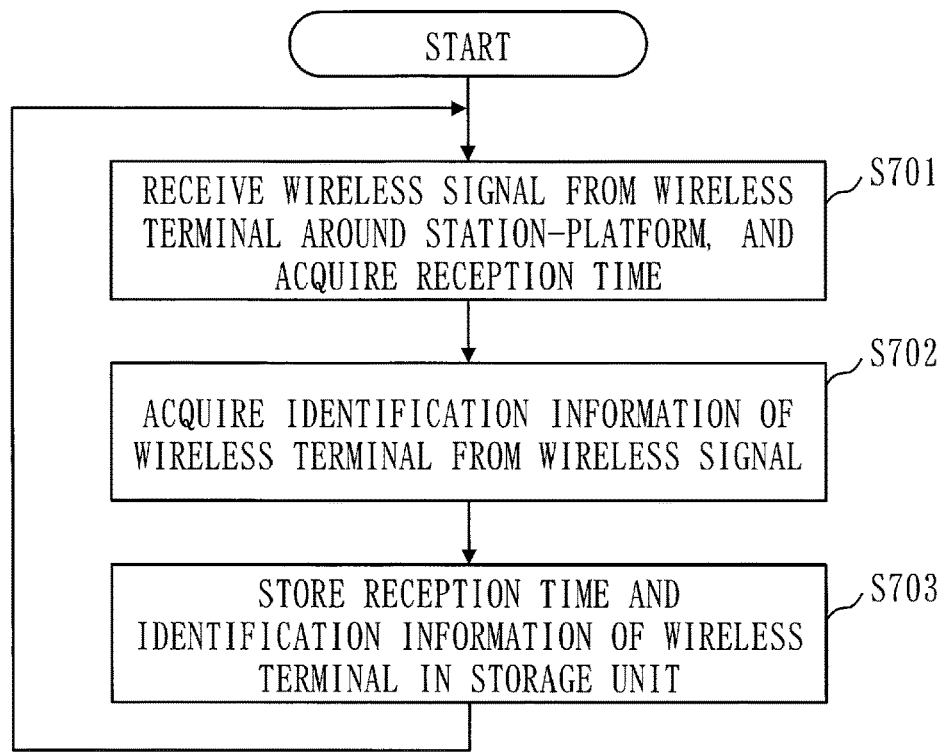
FIG. 14 is a flowchart illustrating an operational example of a station-platform surrounding wireless terminal determination unit of the on-station-platform wireless device according to Embodiment 3.
Figure 15:
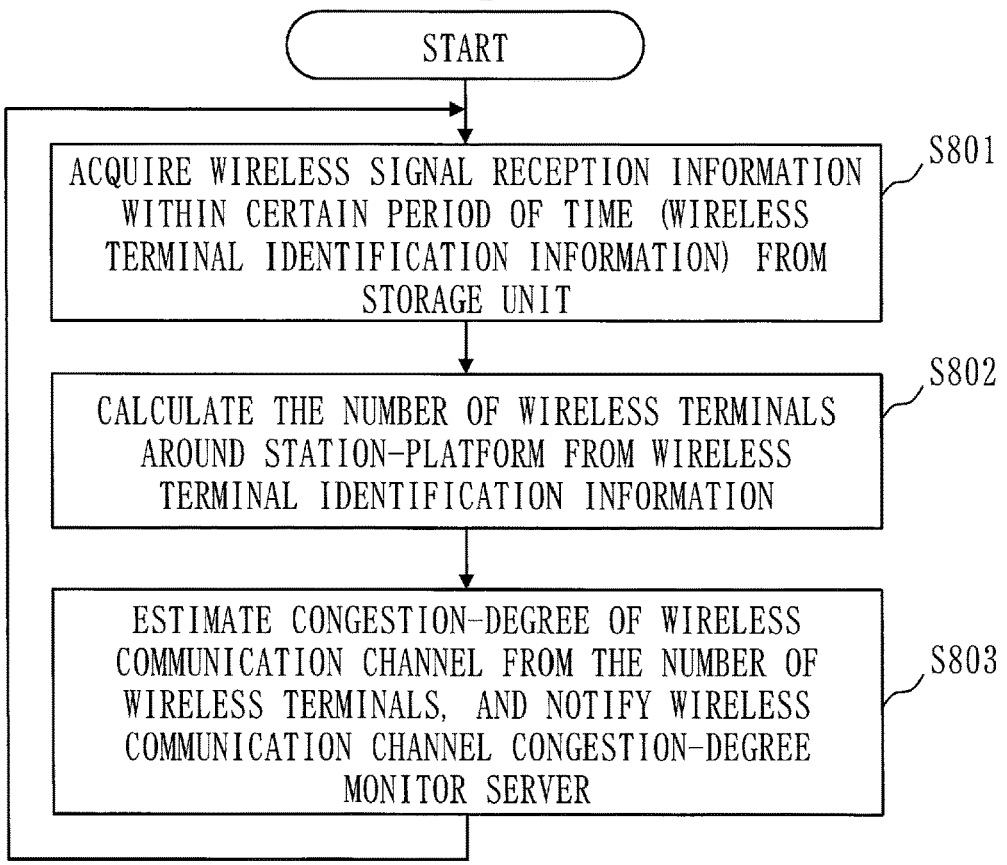
FIG. 15 is a flowchart illustrating an operational example of a wireless communication channel congestion-degree determination unit of the on-station-platform wireless device according to Embodiment 3.

Operation of the on-station-platform wireless device 700 according to the present embodiment is described with reference to FIG. 14 and FIG. 15. Operation illustrated in FIG. 14 is operation of the station-platform-surrounding wireless terminal determination unit 711. Operation illustrated in FIG. 15 is operation of the wireless communication channel congestion-degree determination unit 712.

In step S701 of FIG. 14, the station-platform-surrounding wireless terminal determination unit 711 receives, from the reception unit 731, information of a wireless signal 810 transmitted from a wireless terminal 800 around the station-platform. In addition, the station-platform-surrounding wireless terminal determination unit 711 acquires current time from a time management unit, which is not illustrated. Also, the station-platform-surrounding wireless terminal determination unit 711 retains identification information of the wireless terminal 800, and retains the current time as a reception time. The time management unit may be a time management function provided by an OS operating on the processor 710, or may be a different time management device.

In step S702 of FIG. 14, the station-platform-surrounding wireless terminal determination unit 711 acquires identification information of the wireless terminal 800 around the station-platform based on the information of the wireless signal 810 acquired in step S701. Identification information of the wireless terminal 800 is specifically a MAC (Media Access Control) address.

In step S703 of FIG. 14, the station-platform-surrounding wireless terminal determination unit 711 stores, in wireless signal reception information 951 of the storage unit 721, the reception time acquired in step S701 and the identification information of the wireless terminal 800 acquired in step S702.

In step S801 of FIG. 15, the wireless communication channel congestion-degree determination unit 712 acquires, from the wireless signal reception information 951 of the storage unit 721, wireless signal reception information 951 within a certain period from the current time, that is, the identification information of the wireless terminal 800.

In step S802 of FIG. 15, the wireless communication channel congestion-degree determination unit 712 calculates the number of wireless terminals 800 existing around, from the identification information of the wireless terminal 800 acquired in step S801.

In step S803 of FIG. 15, the wireless communication channel congestion-degree determination unit 712 estimates the congestion-degree of the wireless communication channel around the station-platform, from the number of the wireless terminals 800 calculated in step S802. Also, the wireless communication channel congestion-degree determination unit 712 transmits the congestion-degree of the wireless communication channel and the identification information of the station-platform to the wireless communication channel congestion-degree monitor server 400 via the network interface 740. The congestion-degree of the wireless communication channel is specifically a wireless frame error rate, and is calculated from a relation measured in advance between the number of wireless terminals existing around and the frame error rate. As the number of wireless terminals existing around increases, the frame error rate tends to increase.

In the present embodiment, a configuration example in a case where the delivery data transmission device 100A-2 includes the GPS module 160 is described, however, a configuration may be such that position information of the first car is acquired from the outside as in Embodiment 2.

Description of Effect of Embodiment

In the present embodiment, as described above, the on-station-platform wireless device 700 estimates the congestion-degree of the wireless communication channel around the station-platform and notifies the delivery data transmission device 100A-2 of the congestion-degree of the wireless communication channel via the wireless communication channel congestion-degree monitor server 400. Thereby, the delivery data transmission device 100A-2 improves accuracy of the congestion-degree of the wireless communication channel used to decide the redundancy-degree of the erasure-correction code, and system throughput of data delivery can be improved.

Embodiment 4

Description of Configuration of Delivery Data Transmission Device 100A-3

Figure 16:
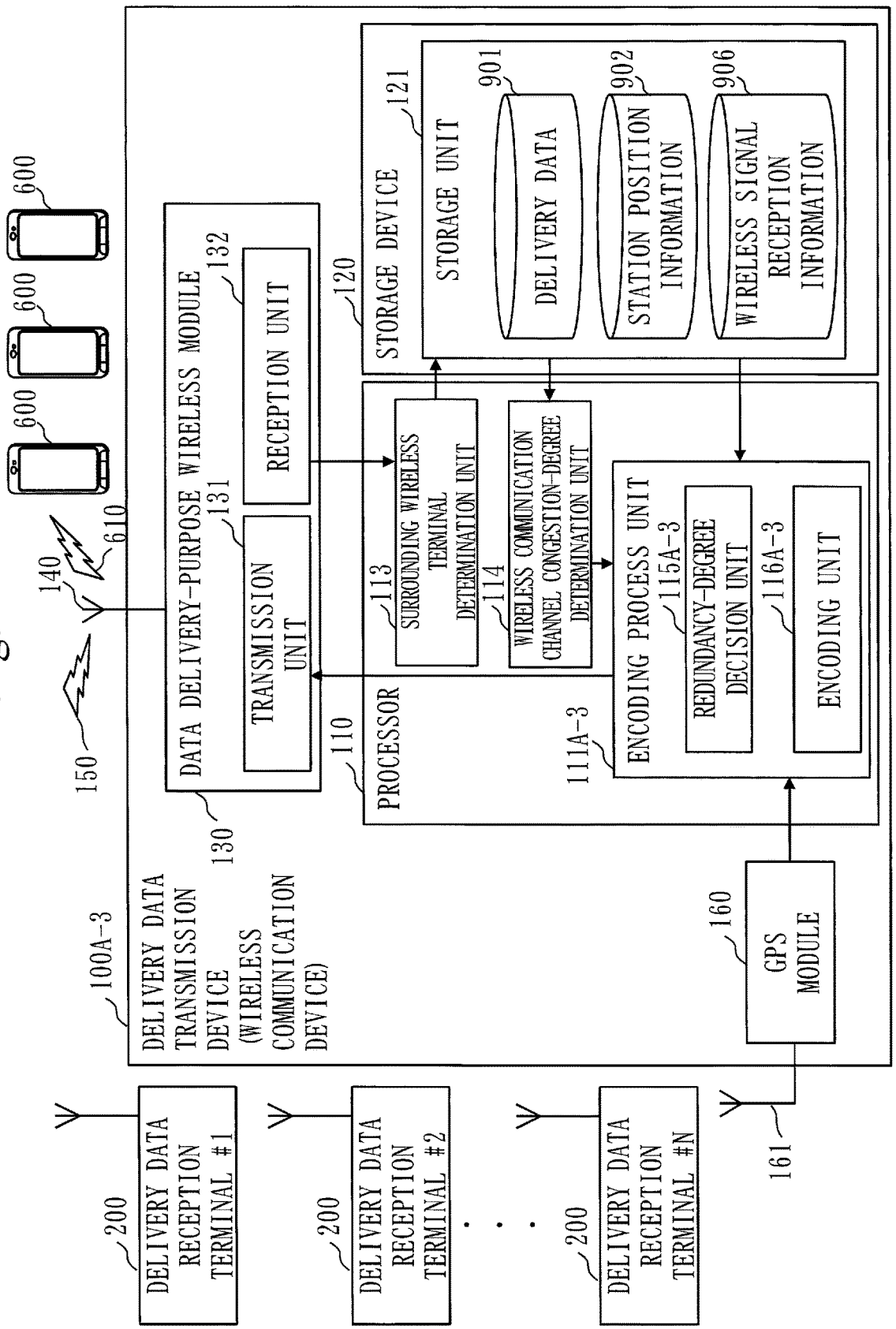
FIG. 16 is a diagram illustrating a configuration example of a delivery data transmission device according to Embodiment 4.

FIG. 16 is a diagram illustrating a configuration example of a delivery data transmission device 100A-3 according to the present embodiment. The delivery data transmission device 100A-3 includes hardware such as a processor 110, a storage device 120, a data delivery-purpose wireless module 130, a data delivery-purpose wireless module antenna 140, a GPS module 160 and a GPS antenna 161.

Hardware of the delivery data transmission device 100A-3 is the same as the delivery data transmission device 100A in Embodiment 1.

The delivery data transmission device 100A-3 also corresponds to a wireless communication device. Also, operation performed by the delivery data transmission device 100A-3 corresponds to a wireless communication method and a wireless communication program.

The delivery data reception terminals 200 in FIG. 16 are the same as Embodiment 1.

The processor 110 is connected with other hardware components via signal lines, and controls these other hardware components.

In the present embodiment, the processor 110 executes programs for realizing functions of an encoding process unit 111A-3, a surrounding wireless terminal determination unit 113 and a wireless communication channel congestion-degree determination unit 114. The programs for realizing functions of the encoding process unit 111A-3, the surrounding wireless terminal determination unit 113 and the wireless communication channel congestion-degree determination unit 114 are stored in the storage device 120. The processor 110 reads out the programs for realizing functions of the encoding process unit 111A-3, the surrounding wireless terminal determination unit 113 and the wireless communication channel congestion-degree determination unit 114 from the storage device 120. Then, the processor 110 executes the programs, and realizes functions of the encoding process unit 111A-3, the surrounding wireless terminal determination unit 113 and the wireless communication channel congestion-degree determination unit 114 described later.

The surrounding wireless terminal determination unit 113 receives, from a reception unit 132, information of a wireless signal 610 transmitted by a wireless terminal 600 around the delivery data transmission device 100A-3. Also, the surrounding wireless terminal determination unit 113 acquires, from the received information of the wireless signal 610, identification information of the wireless terminal 600 around the delivery data transmission device 100A-3.

The wireless communication channel congestion-degree determination unit 114 calculates the number of wireless terminals 600 existing around the delivery data transmission device 100A-3, that is the number of wireless terminals 600 in the car, from the identification information of the wireless terminal 600 acquired by the surrounding wireless terminal determination unit 113. Then, the wireless communication channel congestion-degree determination unit 114 estimates a congestion-degree of a wireless communication channel around the delivery data transmission device 100A-3 from the calculated number of wireless terminals 600 existing around.

A redundancy-degree decision unit 115A-3 calculates an candidate of a redundancy-degree of an erasure-correction code to be applied to delivery data 901 as a first redundancy-degree candidate, in the same way as the redundancy-degree decision method described in Embodiment 1, based on the congestion-degree of the wireless communication channel around the next arrival station.

Also, the redundancy-degree decision unit 115A-3 calculates a candidate of the redundancy-degree of the erasure-correction code to be applied to delivery data 901 as a second redundancy-degree candidate, based on the congestion-degree of the wireless communication channel around a current position of the delivery data transmission device 100A-3. More specifically, the redundancy-degree decision unit 115A-3 calculates the second redundancy-degree candidate in the same way as the redundancy-degree decision method described in Embodiment 1, based on the congestion-degree of the wireless communication channel around the delivery data transmission device 100A-3 estimated by the wireless communication channel congestion-degree determination unit 114.

Then, the redundancy-degree decision unit 115A-3 selects either the first redundancy-degree candidate or the second redundancy-degree candidate, as the redundancy-degree of the erasure-correction code to be applied to delivery data 901. More specifically, the redundancy-degree decision unit 115A-3 selects the second redundancy-degree candidate for the redundancy-degree of the erasure-correction code to be applied to the delivery data 901 if a value of the second redundancy-degree candidate is equal to or more than a value of the first redundancy-degree candidate. On the other hand, the first redundancy-degree candidate is selected for the redundancy-degree of the erasure-correction code to be applied to the delivery data 901 if the value of the second redundancy-degree candidate is smaller than the value of the first redundancy-degree candidate.

An encoding unit 116A-3 encodes the delivery data 901 into the erasure-correction code at an encoding rate corresponding to the redundancy-degree decided by the redundancy-degree decision unit 115A-3.

Description of Operation of Delivery Data Transmission Device 100A-3

Figure 17:
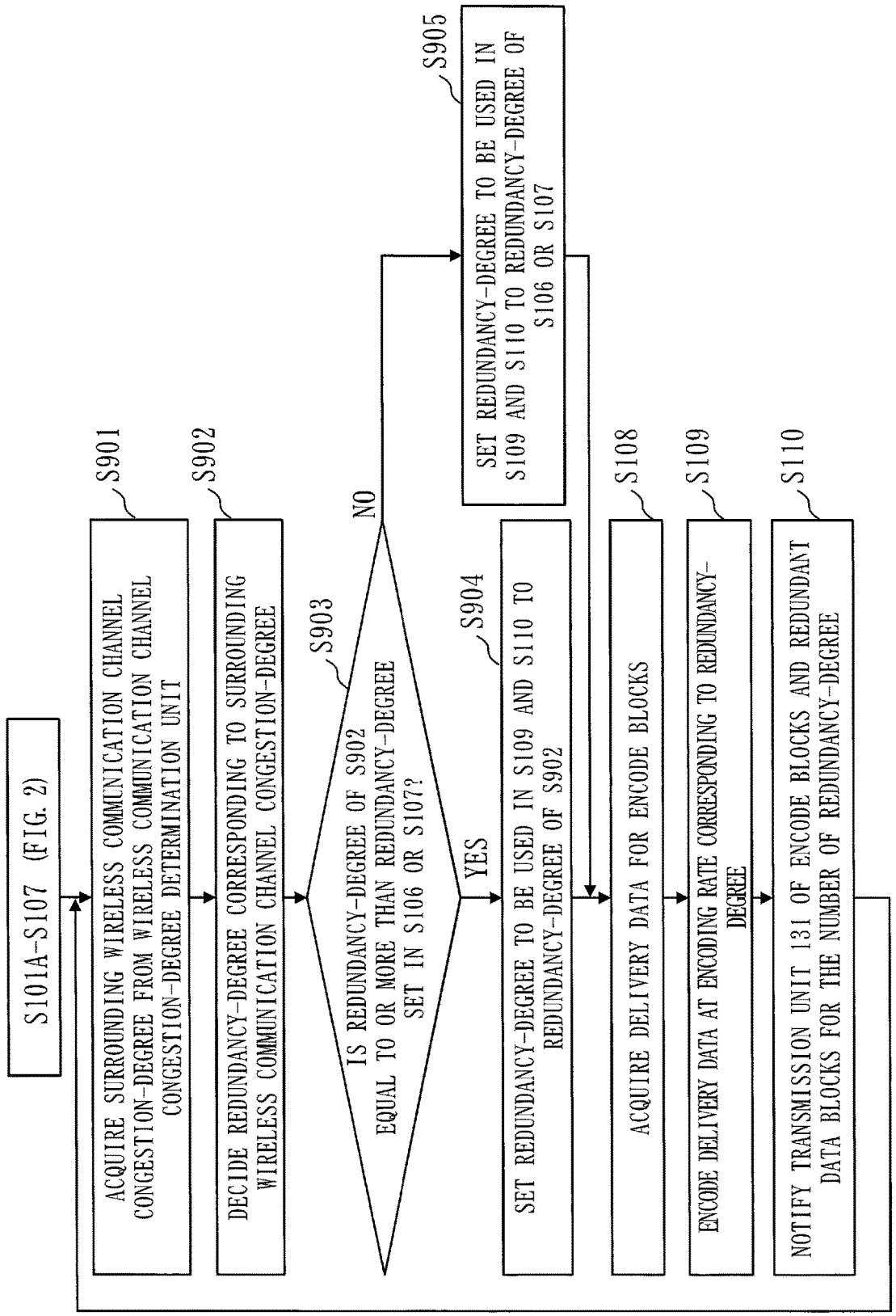
FIG. 17 is a flowchart illustrating an operational example of an encoding process unit of the delivery data transmission device according to Embodiment 4.

Operation of the delivery data transmission device 100A-3 according to the present embodiment is described with reference to FIG. 17, FIG. 18 and FIG. 19. Operation illustrated in FIG. 17 is operation of the encoding process unit 111A-3. Steps S101A-S110 in FIG. 17 are the same as those of the encoding process unit 111A of the delivery data transmission device 100A in Embodiment 1 (FIG. 2). in FIG. 17 indicates that steps S101A-S107 of FIG. 2 are performed.

Figure 18:
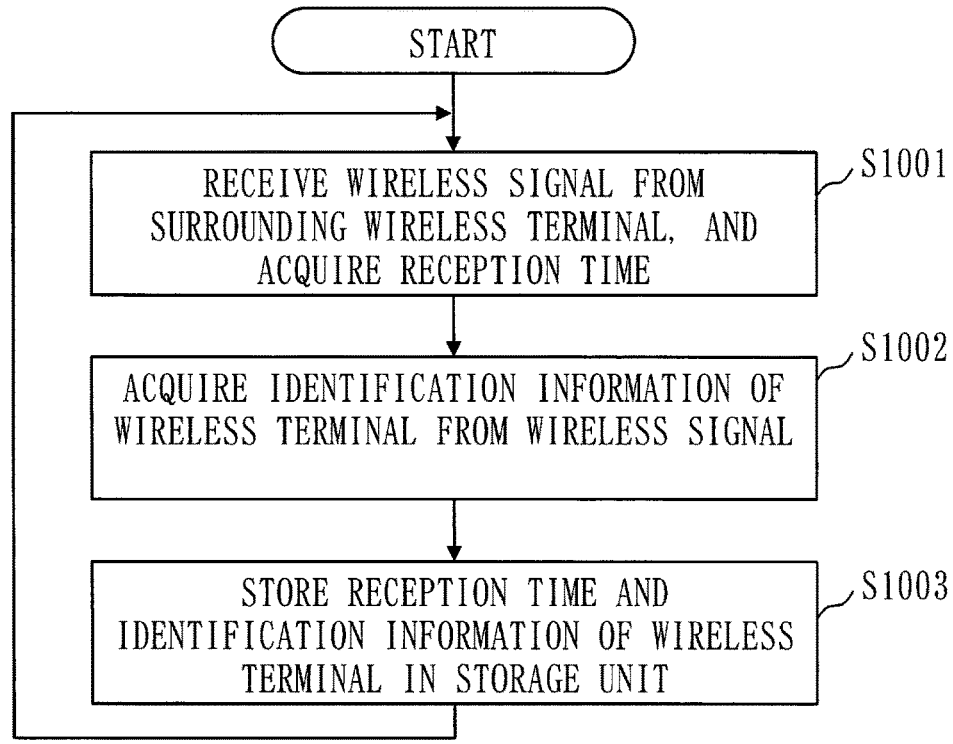
FIG. 18 is a flowchart illustrating an operational example of a surrounding wireless terminal determination unit of the delivery data transmission device according to Embodiment 4.

Operation illustrated in FIG. 18 is operation of the surrounding wireless terminal determination unit 113.

Figure 19:
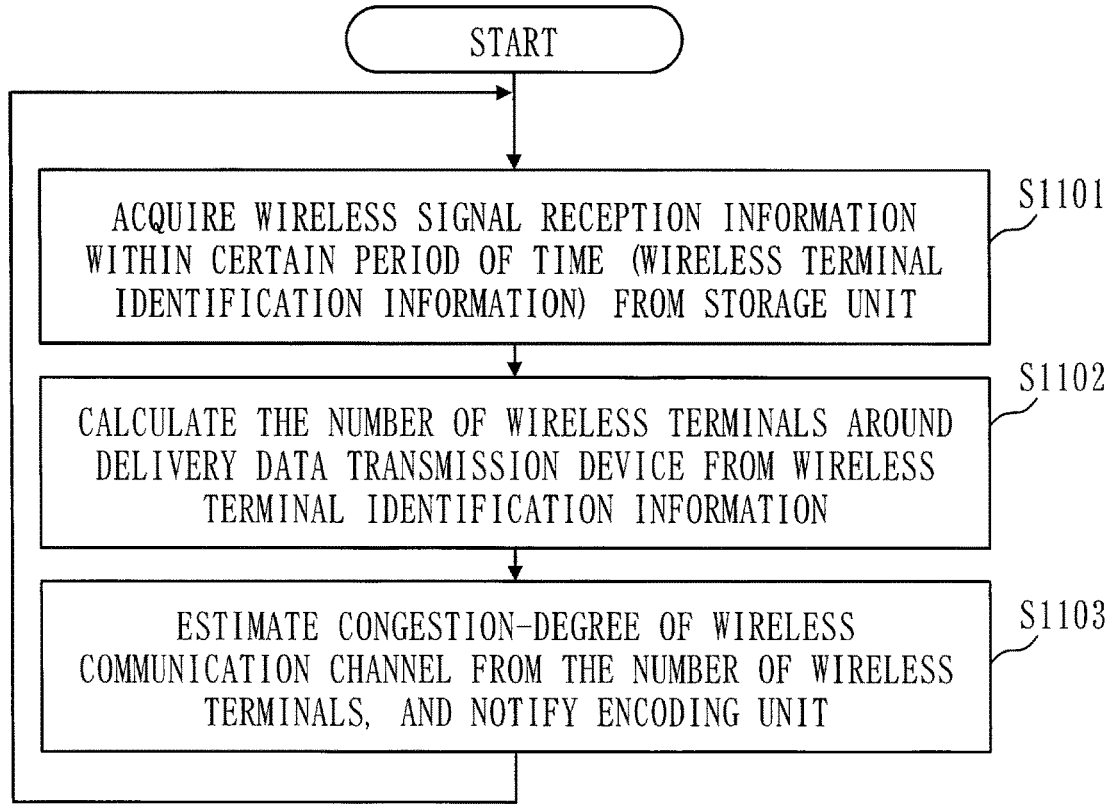
FIG. 19 is a flowchart illustrating an operational example of a wireless communication channel congestion-degree determination unit of the delivery data transmission device according to Embodiment 4.

Operation illustrated in FIG. 19 is operation of the wireless communication channel congestion-degree determination unit 114.

In step S901 of FIG. 17, the encoding process unit 111A-3 acquires a congestion-degree of a wireless communication channel around the delivery data transmission device 100A-3 from the wireless communication channel congestion-degree determination unit 114. The congestion-degree of the wireless communication channel is specifically a wireless frame error rate.

In step S902 of FIG. 17, the encoding process unit 111A-3 decides a redundancy-degree of an erasure-correction code, based on the congestion-degree of the wireless communication channel acquired in step S901. That is, the encoding process unit 111A-3 decides the redundancy-degree of the erasure-correction code according to the frame error rate. Specifically, the encoding process unit 111A-3 decides the redundancy-degree, i.e. the number of encode blocks and redundant data blocks, which enables the delivery data reception terminal 200 to recover the delivery data 901 by the erasure-correction code, even when a wireless frame error occurs at the frame error rate. The redundancy-degree corresponding to the frame error rate, at which the delivery data 901 is recoverable by the erasure-correction code varies depending on the encoding scheme. The redundancy-degree acquired in step S902 is the second redundancy-degree candidate.

In step S903 of FIG. 17, the encoding process unit 111A-3 compares the redundancy-degree (the second redundancy-degree candidate) decided in step S902 with the redundancy-degree (the first redundancy-degree candidate) decided in S106 or S107. When the redundancy-degree of S902 is equal to or higher than the redundancy-degree of S106 or S107, the process proceeds to step S904. When the redundancy-degree of S902 is lower than the redundancy degree of S106 or S107, the process proceeds to step S905.

In step S904 of FIG. 17, the encoding process unit 111A-3 sets the redundancy-degree to be used in processes of S109 and S110 such that the redundancy-degree decided in step S902 is used.

In step S905 of FIG. 17, the encoding process unit 111A-3 sets the redundancy-degree to be used in processes of S109 and S110 such that the redundancy-degree decided in step S106 or S107 is used.

In step S1001 of FIG. 18, the surrounding wireless terminal determination unit 113 receives information on a wireless signal 610 transmitted by a wireless terminal 600 around the delivery data transmission device 100A-3, from the reception unit 132. In addition, the surrounding wireless terminal determination unit 113 acquires current time from a time management unit, which is not illustrated. Also, the surrounding wireless terminal determination unit 113 retains identification information of the wireless terminal 600, and the current time as reception time. The time management unit may be a time management function provided by an OS operating on the processor 110, or may be a different time management device.

In step S1002 of FIG. 18, the surrounding wireless terminal determination unit 113 acquires the identification information of the wireless terminal 600 around the delivery data transmission device 100A-3, from the information on the wireless signal 610 received in step S1001. The identification information of the wireless terminal 600 is specifically a MAC address.

In step S1003 of FIG. 18, the surrounding wireless terminal determination unit 113 stores, in wireless signal reception information 906 of the storage unit 121, the reception time acquired in step S1001 and the identification information of the wireless terminal 600 acquired in step S1002.

In step S1101 of FIG. 19, the wireless communication channel congestion-degree determination unit 114 acquires, from the wireless signal reception information 906 of the storage unit 121, wireless signal reception information within a certain period from the current time, that is, the identification information of the wireless terminal 600.

In step S1102 of FIG. 19, the wireless communication channel congestion-degree determination unit 114 calculates, from the identification information of the wireless terminal 600 acquired in step S1101, the number of the wireless terminals 600 existing around the delivery data transmission device 100A-3, that is, the number of the wireless terminals 600 inside the train car. In order to exclude the wireless terminals 600 outside the train from the number of the wireless terminals to be calculated, the wireless communication channel congestion-degree determination unit 114 may count only the wireless terminals whose identification information is stored in the wireless signal reception information 906 for a certain number of times or for a certain period of time, as the number of wireless terminals to be calculated.

In step S1103 of FIG. 19, the wireless communication channel congestion-degree determination unit 114 estimates the congestion-degree of the wireless communication channel around the delivery data transmission device 100A-3 from the number of the wireless terminals 600 around the delivery data transmission device 100A-3 calculated in step S1102. Also, the wireless communication channel congestion-degree determination unit 114 transmits the congestion-degree of the wireless communication channel to the encoding process unit 111A-3. The congestion-degree of the wireless communication channel is specifically a wireless frame error rate, and the wireless frame error rate is calculated from a relation, measured in advance, between the number of wireless terminals around the delivery data transmission device 100A-3 and the frame error rate. As the number of wireless terminals around the delivery data transmission device 100A-3 increases, the frame error rate tends to increase.

In the present embodiment, a configuration example in a case where the delivery data transmission device 100A-3 includes the GPS module 160 is illustrated, however, a configuration may be such that position information of the first car is acquired from the outside as in Embodiment 2.

Description of Effect of Embodiment

In the present embodiment, as described above, the delivery data transmission device 100A-3 receives by the reception unit 132 of the data delivery-purpose wireless module 130 the wireless signal 610 transmitted by the wireless terminal 600 around the delivery data transmission device 100A-3. Also, the delivery data transmission device 100A-3 estimates the congestion-degree of the wireless communication channel around the delivery data transmission device 100A-3, and improves accuracy of the congestion-degree of the wireless communication channel to be used for deciding the redundancy-degree of the erasure-correction code. By doing this, system throughput of data delivery can be improved.

Embodiment 5

Description of Configuration of Delivery Data Transmission Device 100A-4

Figure 20:
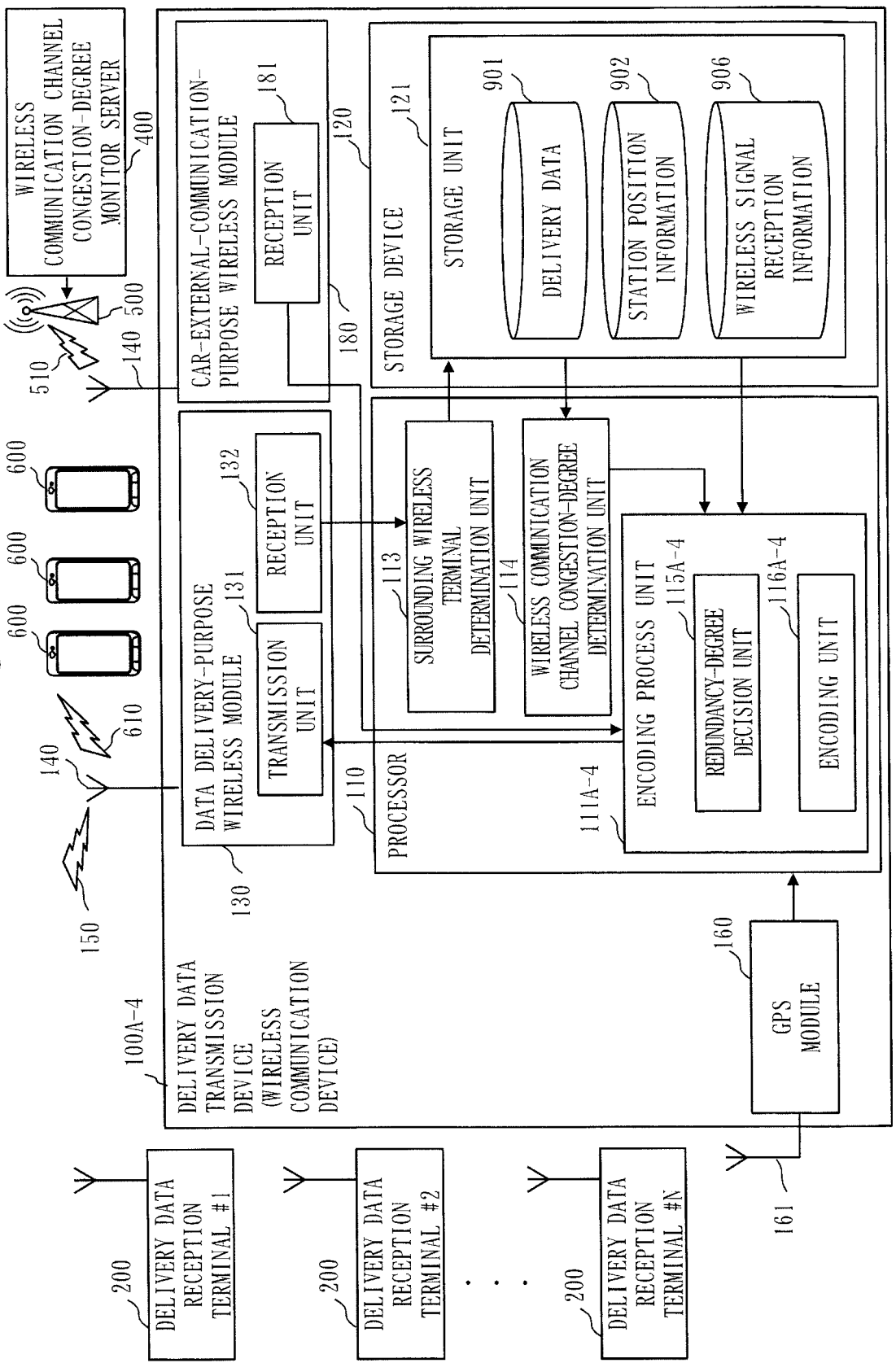
FIG. 20 is a flowchart illustrating a configuration example of a delivery data transmission device according to Embodiment 5.

FIG. 20 is a diagram illustrating a configuration example of a delivery data transmission device 100A-4 according to the present embodiment. The delivery data transmission device 100A-4 includes hardware such as a processor 110, a storage device 120, a data delivery-purpose wireless module 130, a data delivery-purpose wireless module antenna 140, a GPS module 160, a GPS antenna 161, a car-external-communication-purpose wireless module 180 and a car-external-communication-purpose wireless module antenna 190.

Hardware of the delivery data transmission device 100A-4 is the same as hardware of the delivery data transmission device 100A-2 in Embodiment 3.

The delivery data transmission device 100A-4 also corresponds to a wireless communication device. Also, operation performed by the delivery data transmission device 100A-4 corresponds to a wireless communication method and a wireless communication program.

A delivery data reception terminal 200 in FIG. 20 is the same as Embodiment 1. A wireless communication channel congestion-degree monitor server 400 in FIG. 20 is the same as Embodiment 3. Wireless terminals 600 around the delivery data transmission device 100A-4 in FIG. 20 are the same as Embodiment 4.

The processor 110 is connected with other hardware components via signal lines, and controls these other hardware components.

In the present embodiment, the processor 110 executes programs for realizing functions of an encoding process unit 111A-4, a surrounding wireless terminal determination unit 113 and a wireless communication channel congestion-degree determination unit 114. The programs for realizing functions of the encoding process unit 111A-4, the surrounding wireless terminal determination unit 113 and the wireless communication channel congestion-degree determination unit 114 are stored in the storage device 120. The processor 110 reads out the programs for realizing functions of the encoding process unit 111A-4, the surrounding wireless terminal determination unit 113 and the wireless communication channel congestion-degree determination unit 114 from the storage device 120. Then, the processor 110 executes the programs, and realizes functions of the encoding process unit 111A-4, the surrounding wireless terminal determination unit 113 and the wireless communication channel congestion-degree determination unit 114 described later.

A redundancy-degree decision unit 115A-4 acquires a congestion-degree of a wireless communication channel around the next arrival station in the method described in Embodiment 3, from the wireless communication channel congestion-degree monitor server 400 which is an external device. The redundancy-degree decision unit 115A-4 calculates a redundancy-degree candidate as the first redundancy-degree candidate, based on the acquired congestion-degree of the wireless communication channel around the next arrival station.

Also, the redundancy-degree decision unit 115A-4 calculates a redundancy-degree candidate of an erasure-correction code to be applied to delivery data 901 as the second redundancy-degree candidate in the method described in Embodiment 4, based on the congestion-degree of the wireless communication channel around a current position of the delivery data transmission device 100A-4.

Then, the redundancy-degree decision unit 115A-4 selects either the first redundancy-degree candidate or the second redundancy-degree candidate to be the redundancy-degree of the erasure-correction code applied to the delivery data 901, as in Embodiment 4.

Description of Operation of Delivery Data Transmission Device 100A-4

Operation of the delivery data transmission device 100A-4 according to the present embodiment is described with reference to FIG. 21. Operation illustrated in FIG. 21 is operation of the encoding process unit 111A-4. Steps S101A-S110 in FIG. 21 are the same as those of the encoding process unit 111A of the delivery data transmission device 100A in Embodiment 1 (FIG. 2). Step S401 of FIG. 21 is the same as that of the encoding process unit 111A-2 of the delivery data transmission device 100A-2 in Embodiment 3 (FIG. 9). Steps S901-S905 in FIG. 21 are the same as those of the encoding process unit 111A-3 of the delivery data transmission device 100A-3 in Embodiment 4 (FIG. 17). "S903-S905, S108-S110 (FIG. 17)" in FIG. 21 indicates that operation of steps S903-S905, S108-S110 of FIG. 17 is performed.

Operation of an encoding process unit 100A-4 in the present embodiment corresponds to the operation of the encoding process unit 111A-3 of Embodiment 4 (FIG. 17) with an alteration of steps S104 and S105 (FIG. 17) for calculating the congestion-degree of the wireless communication channel around the station to a step illustrated as step S401 in FIG. 21 for acquiring the congestion-degree of the wireless communication channel on the station-platform notified from the wireless communication channel congestion-degree monitor server.

Description of Operation of Delivery Data Transmission Device 100A-3

Operation of the delivery data transmission device 100A-4 according to the present embodiment is described with reference to FIG. 21. Operation illustrated in FIG. 21 is operation of the encoding process unit 111A-4. Steps S101A-S110 in FIG. 21 are the same as those of the encoding process unit 111A of the delivery data transmission device 100A in Embodiment 1 (FIG. 2). Step S401 of FIG. 21 is the same as that of the encoding process unit 111A-2 of the delivery data transmission device 100A-2 in Embodiment 3 (FIG. 9). Steps S901-S905 in FIG. 21 are the same as those of the encoding process unit 111A-3 of the delivery data transmission device 100A-3 in Embodiment 4 (FIG. 17). "S903-S905, S108-S110 (FIG. 17)" in FIG. 21 indicates that operation of steps S903-S110 of FIG. 17 is performed.

Operation of an encoding process unit 100A-4 in the present embodiment corresponds to the operation of the encoding process unit 100A-3 of Embodiment 4 (FIG. 17) with an alteration of steps S104 and S105 (FIG. 17) for calculating the congestion-degree of the wireless communication channel around the station to a step illustrated as step S401 in FIG. 21 for acquiring the congestion-degree of the wireless communication channel on the station-platform notified from the wireless communication channel congestion-degree monitor server.

In the present embodiment, a configuration example in a case where the delivery data transmission device 100A-4 includes the GPS module 160 is described, however, a configuration may be such that position information of the first car is acquired from the outside as in Embodiment 2.

Description of Effect of Embodiment

In the present embodiment, as described above, the congestion-degree of the wireless communication channel on the station-platform is notified from the wireless communication channel congestion-degree monitor server 400 to the delivery data transmission device 100A-4. Also, the delivery data transmission device 100A-4 receives by the reception unit 132 of the data delivery-purpose wireless module 130 the wireless signal 610 transmitted from the wireless terminal 600 around the delivery data transmission device 100A-4, and estimates the congestion-degree of the wireless communication channel around the delivery data transmission device 100A-4. By doing this, accuracy of the congestion-degree of the wireless communication channel can be improved, the congestion-degree to be used for the delivery data transmission device 100A-4 to decide the redundancy-degree of the erasure-correction code. Also, system throughput of data delivery can be improved.

In the above-described embodiments of the present invention, two of the embodiments may be implemented in combination.

Alternatively, one embodiment of the two embodiments may be implemented partially.

Alternatively, the two embodiments may be implemented in partial combination.

The present invention is not restricted to these embodiments, and various modifications can be made as necessary.

REFERENCE SIGNS LIST

100A: delivery data transmission device, 100B: delivery data transmission device, 100A-2: delivery data transmission device, 110: processor, 111A: encoding process unit, 111B: encoding process unit, 111A-2: encoding process unit, 111A-3: encoding process unit, 111A-4: encoding process unit, 112: position information calculation unit, 113: surrounding wireless terminal determination unit, 114: wireless communication channel congestion-degree determination unit, 115A: redundancy-degree decision unit, 115B: redundancy-degree decision unit, 115A-2: redundancy-degree decision unit, 115A-3: redundancy-degree decision unit, 115A-4: redundancy-degree decision unit, 116A: encoding unit, 116B: encoding unit, 116A-2: encoding unit, 116A-3: encoding unit, 116A-4: encoding unit, 120: storage device, 121: storage unit, 130: data delivery-purpose wireless module, 131: transmission unit, 132: reception unit, 140: data delivery-purpose wireless module antenna, 150: wireless signal, 160: GPS module, 161: GPS antenna, 170: first car position information input interface, 180: car-external-communication-purpose wireless module, 181: reception unit, 190: car-external-communication-purpose wireless module antenna, 200: delivery data reception terminal, 210: processor, 211: decoding process unit, 220: storage device, 221: storage unit, 230: wireless module, 231: reception unit, 240: wireless module antenna, 300: first car position information input device, 400: wireless communication channel congestion-degree monitor server, 410: processor, 411: wireless communication channel congestion-degree information reception unit, 412: wireless communication channel congestion-degree information transmission unit, 420: storage device, 421: storage unit, 430: network interface A, 440: network interface B, 500: wireless communication base station, 510: wireless signal, 600: wireless terminal, 610: wireless signal, 700: on-station-platform wireless device, 710: processor, 711: station-platform-surrounding wireless terminal determination unit, 712: wireless communication channel congestion-degree determination unit, 720: storage device, 721: storage unit, 730: wireless module, 731: reception unit, 740: network interface, 750: antenna, 800: wireless terminal, 810: wireless signal, 901: delivery data, 902: station position information, 903: station-user statistical information, 904: car number information, 905: car length information, 906: wireless signal reception information, 921: delivery data, 922: reception data, 941: wireless communication channel congestion-degree information per station-platform, 951: wireless signal reception information.

The invention claimed is:

1. A wireless communication device mounted on a train, which transmits delivery data, the wireless communication device comprising:
   processing circuitry:
   to decide a redundancy-degree of an erasure-correction code to be applied to the delivery, data, when a distance between the wireless communication device and a next arrival station becomes equal to or smaller than a threshold value, the next arrival station being a station at which the train arrives next, based on a congestion-degree of a wireless communication channel around the next arrival station; and
   to encode the delivery data into an erasure-correction code at an encoding rate corresponding to the redundancy-degree decided,
   wherein the processing circuitry calculates a candidate of the redundancy-degree of the erasure-correction code to be applied to the delivery data as a first redundancy-degree candidate, based on the congestion-degree of the wireless communication channel around the next arrival station;
   wherein the processing circuitry calculates a candidate of a redundancy-degree of an erasure-correction code to be applied to the delivery data as a second redundancy-degree candidate, based on the congestion-degree of the wireless communication channel around a current position of the wireless communication device; and
   wherein the processing circuitry selects either the first redundancy-degree candidate or the second redundancy-degree candidate as the redundancy-degree of the erasure correction code to be applied to the delivery data.

2. The wireless communication device according to claim 1,
   wherein the processing circuitry selects the second redundancy-degree candidate as the redundancy-degree of the erasure-correction code to be applied to the delivery data when a value of the second redundancy-degree candidate is equal to or more than a value of the first redundancy-degree candidate.

3. The wireless communication device according to claim 1,
   wherein the processing circuitry calculates the second redundancy-degree candidate, based on the congestion-degree of the wireless communication channel around the current position of the wireless communication device, the congestion-degree being estimated from the estimated number of wireless terminals existing around the current position of the wireless communication device.

4. A wireless communication method comprising:
   by a wireless communication device mounted on a train, which transmits delivery data, deciding a redundancy-degree of an erasure-correction code to be applied to the delivery data, when a distance between the wireless communication device and a next arrival station becomes equal to or smaller than a threshold value, the next arrival station being a station at which the train arrives next, based on a congestion-degree of a wireless communication channel around the next arrival station; and by the wireless communication device mounted on a train, which transmits the delivery data, encoding the delivery data into an erasure-correction code at an encoding rate corresponding to the decided redundancy-degree, wherein processing circuitry calculates a candidate of the redundancy-degree of the erasure-correction code to be applied to the delivery data as a first redundancy-degree candidate, based on the congestion-degree of the wireless communication channel around the next arrival station;

wherein the processing circuitry calculates a candidate of a redundancy-degree of an erasure-correction code to be applied to the delivery data as a second redundancy-degree candidate, based on the congestion-degree of the wireless communication channel around a current position of the wireless communication device; and wherein the processing circuitry selects either the first redundancy-degree candidate or the second redundancy-degree candidate as the redundancy-degree of the erasure correction code to be applied to the delivery data.

5. A non-transitory computer readable medium storing a wireless communication program that causes a wireless communication device mounted on a train, which transmits delivery data, to execute:

a redundancy-degree decision process for deciding a redundancy-degree of an erasure-correction code to be applied to the delivery data, when a distance between the wireless communication device and the next arrival station becomes equal to or smaller than a threshold value, the next arrival station being a station at which the train arrives next, based on a congestion-degree of a wireless communication channel around the next arrival station; and an encoding process for encoding the delivery data into an erasure-correction code at an encoding rate corresponding to the redundancy-degree decided by the redundancy-degree decision process, wherein processing circuitry calculates a candidate of the redundancy-degree of the erasure-correction code to be applied to the delivery data as a first redundancy-degree candidate, based on the congestion-degree of the wireless communication channel around the next arrival station;

wherein the processing circuitry calculates a candidate of a redundancy-degree of an erasure-correction code to be applied to the delivery data as a second redundancy-degree candidate, based on the congestion-degree of the wireless communication channel around a current position of the wireless communication device; and wherein the processing circuitry selects either the first redundancy-degree candidate or the second redundancy-degree candidate as the redundancy-degree of the erasure correction code to be applied to the delivery data.

\* \* \* \* \*